United States Patent [19]

Arai et al.

[11] 4,414,626
[45] Nov. 8, 1983

[54] INPUT/OUTPUT CONTROL SYSTEM AND METHODS

[75] Inventors: Michio Arai, Kawasaki; Yukio Shiraogawa, Kunitachi; Tsutomu Sakamoto, Kokubunji; Keizo Aoyagi, Fuchu, all of Japan

[73] Assignee: Tokyo Shibaura Denki Kabushiki Kaisha, Japan

[21] Appl. No.: 213,579

[22] Filed: Dec. 5, 1980

Related U.S. Application Data

[63] Continuation of Ser. No. 949,942, Oct. 10, 1978, abandoned.

[30] Foreign Application Priority Data

Oct. 12, 1977 [JP] Japan .................................. 52-121391

[51] Int. Cl.³ .............................................. G06F 1/00
[52] U.S. Cl. .............................................. 364/200
[58] Field of Search ... 364/200 MS File, 900 MS File

[56] References Cited

U.S. PATENT DOCUMENTS 3,512,133  5/1970  Bennett et al. ................. 364/200 X
3,675,214  7/1972  Ellis et al. ..................... 364/200 X
4,089,051  5/1978  Lee et al. ....................... 364/200 X

OTHER PUBLICATIONS

Soucek, Microprocessors and Microcomputers, John Wiley & Sons, 1976, pp. 151-207 & 574-583.
The Engineering Staff of Analog Devices, Inc., Analog-Digital Conversion Handbook, 6/1972, pp. 1-64 & 1-65.
Hewlett Packard Multiprogrammer Model 6936A Operating and Service Manual, 9/1970, pp. 1-1 to 1-6; 3-1 to 3-11; 4-1 to 4-3.
Gellender, Learn Microprocessor Fundamentals, Electronic Design 21, Oct. 11, 1977, pp. 74-79.

Primary Examiner—T. J. Sloyan
Attorney, Agent, or Firm—Finnegan, Henderson, Farabow, Garrett & Dunner

[57] ABSTRACT

An input/output start instruction includes, as parameters, a channel number, an input/output device number, a channel control block address and a termination que number. A channel receives the channel control block address and reads out the contents of the channel control block from a main memory and sets it in a service table in the channel whereby an input/output processing is executed.

11 Claims, 24 Drawing Figures

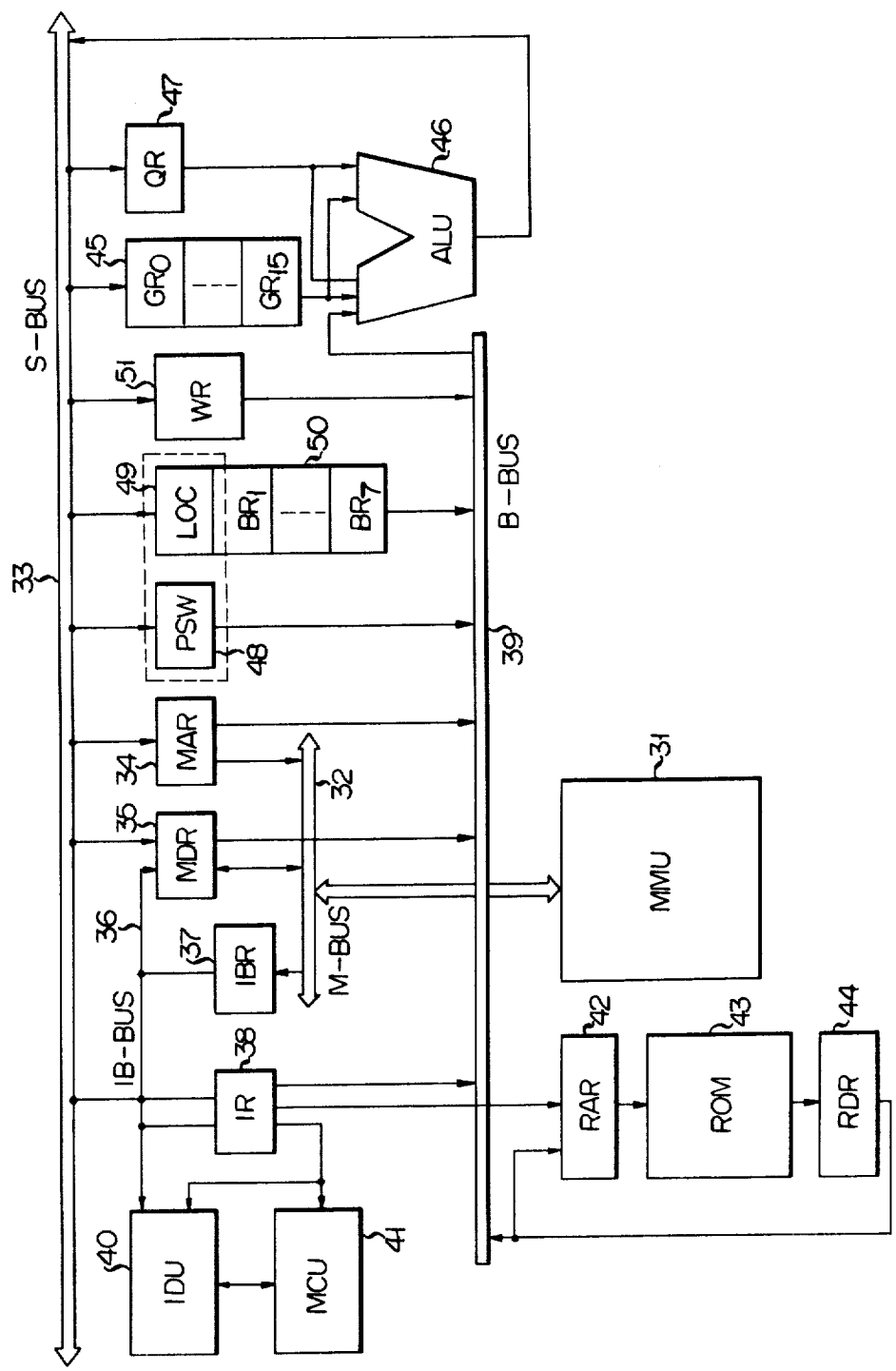
F I G. 2

SIO

TIO

| CCW |||
|---|---|---|
| START ADDRESS / COUNT |||
| COMMAND | TERMINATION CHARACTER | TRANSFER BYTE NUMBER |
| CHANNEL NO. | DEVICE NO. | CHANNEL STATUS / DEVICE STATUS |
| QUEUE NO. | CHAIN ADDRESS 2 ||
| CODE CONVERSION TABLE ADDRESS |||

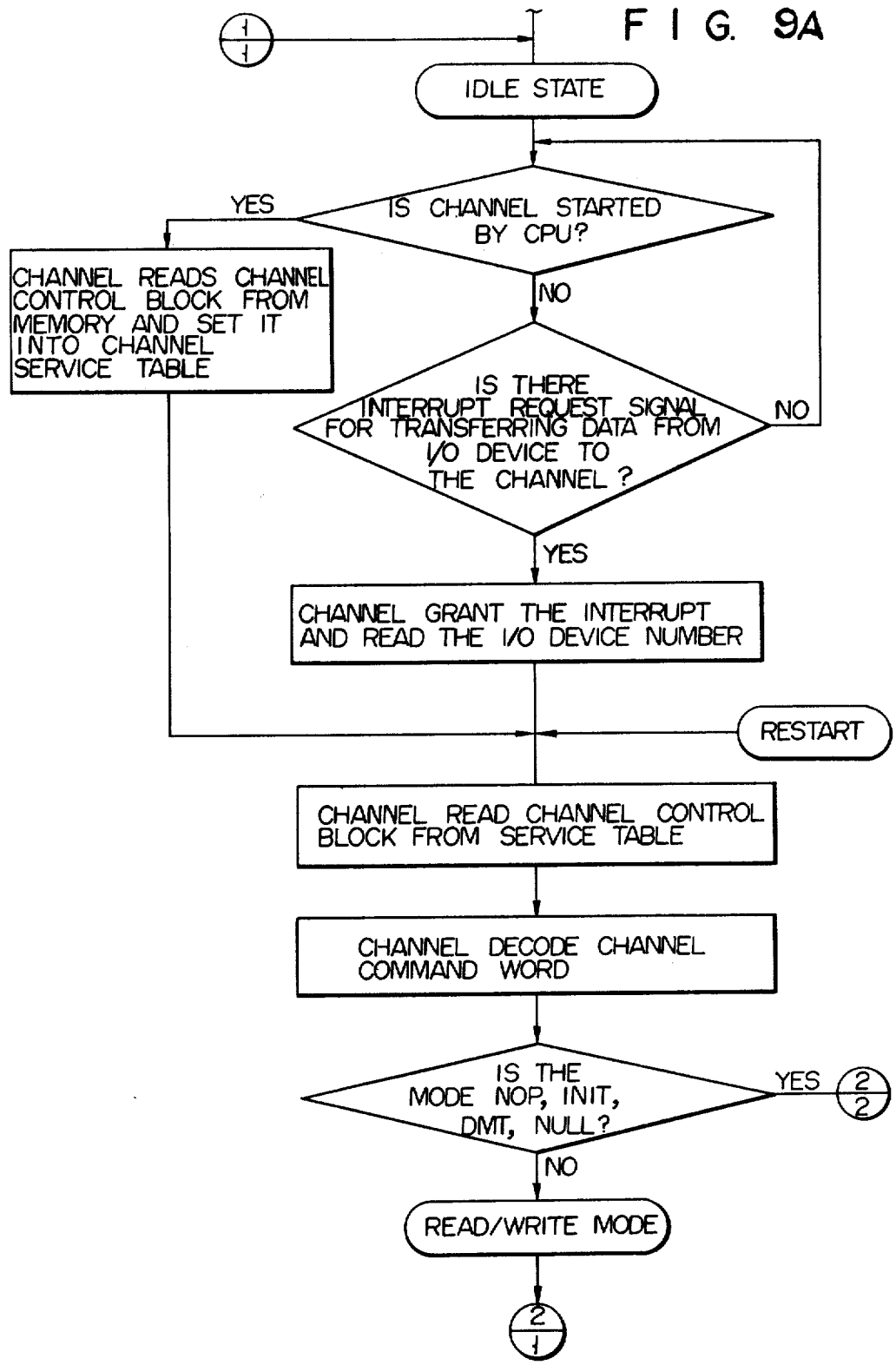

F I G. 9H
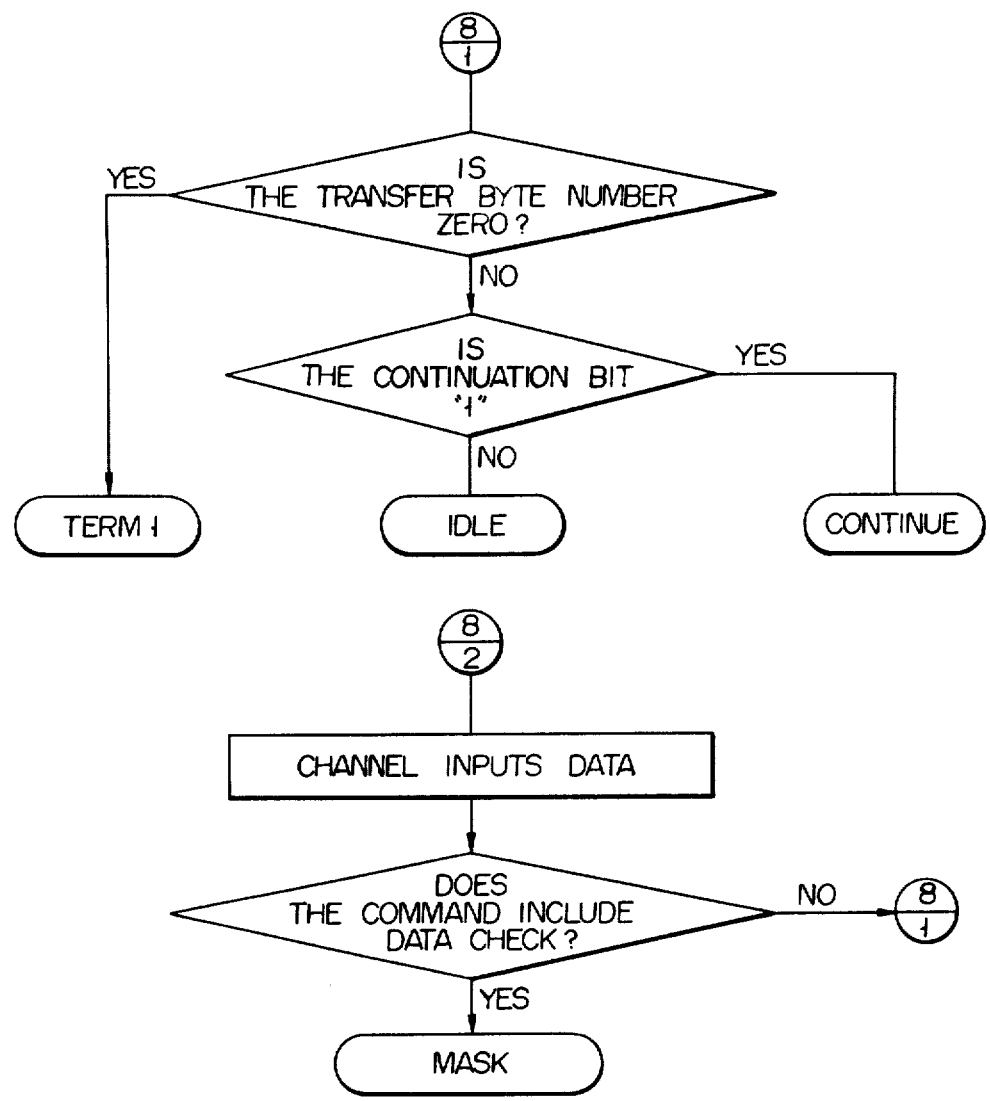

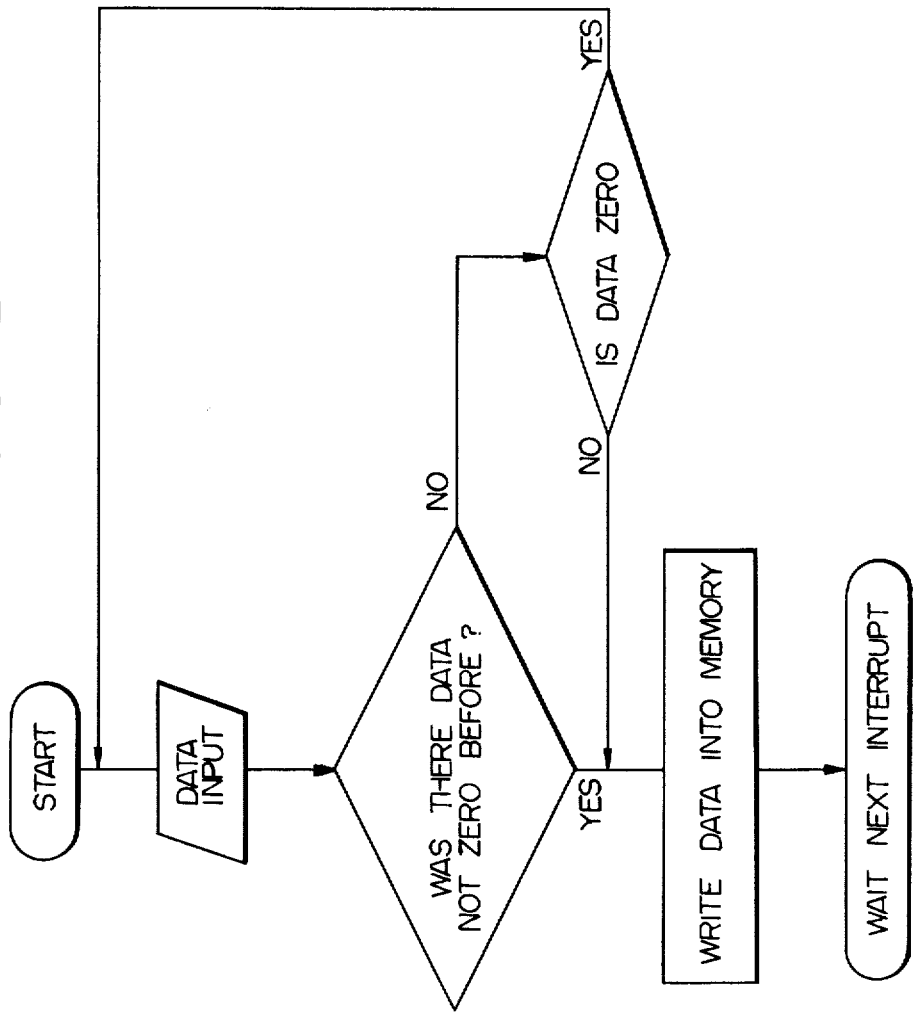

INPUT/OUTPUT CONTROL SYSTEM AND METHODS

This is a continuation of application Ser. No. 949,942, filed Oct. 10, 1978 now abandoned.

BACKGROUND OF THE INVENTION

1. Field of the Invention

The present invention relates to an input/output control system and methods for controlling a series of control words of an input/output program to control the operations of peripheral equipment of an information processor.

2. Prior Art

Hardware for controlling data transfer between an input/output device and a memory is generally called a channel. A conventional channel services a single input/output device at a time. It is very inefficient, however, for a channel with a high transfer rate of several hundred thousand characters per second is exclusively used by an input/output device with a low data transfer rate, at most one thousand characters per second, such as a paper tape reader.

There is one approach to solve the inefficient use in which a plurality of channels with a low transfer rate are used. This approach, however is not preferable in that the amount of hardware used is increased, the control is complicated to that extent, and the manufacturing cost also is high.

Another approach proposed is to use a channel with a high data transfer rate commonly with a plurality of input/output devices in time-division multiplexing mode.

In such a system, the input/output device specifies a memory address for data storing and an index (I/O device number, channel number) of another device to which data is to be transferred.

In an ordinary channel, the I/O device number of an I/O device for storing data is specified by an element for the channel such as an internal counter provided in an arithmetic and logic unit or a control word. With such an arrangement, a program is used for the data transfer to and from a plurality of input/output devices.

In the above-mentioned system, the input/output operation may be performed by hardware, not by software, in the following manner. As input/output device transfers the index to the channel. The address in a main memory specified by the index is read out. That address stores the address in which the next incoming data is stored. The address read out from the main memory unit (MMU) is set in an address selector and the address is incremented or decremented and then is loaded into the corresponding address of the main memory unit. The data succeedingly transferred is stored in the address of the memory in accordance with the contents of the address selector. In this mode, if indexes are differently assigned to the input/output devices respectively, data may be stored in a desired input/output device.

The data transfer control system with one channel for the plurality of input/output devices is advantageous in that it can effectively achieve data transfer since a high speed channel is not occupied by a plurality of input/output devices with low transfer rate. For this reason, the control system is useful for a communication control system.

In the channel of the above-mentioned type, the input/output instruction is executed in a central processing unit (CPU) so that the data transfer is started between the input/output device and the channel specified by the instruction. After the data transfer is once started, the succeeding control of the data transfer is performed independently of the CPU, and the channel performs the input/output operation. Thus, the channel is independent of the CPU. A series of input/output operations are performed under control of an input/output program consisting of a plurality of input/output commands. The input/output commands included in the channel program are for data transfer, transfer of the auxiliary control information to the input/output device, reading out the status information from the input/output device and the like.

The channel, which is responsive to the instruction in the "main program" fetched and executed by the CPU, fetches and executes a "channel program". The channel program consists of a plurality of instructions called channel command words (CCW). In order to execute various operations for a single input/output device in a predetermined sequence, the CCWs corresponding to the various operations are chained to one another. The CCWs represent the kinds of channels, the addresses of the memory where data to be transferred is stored, the number of bytes of data to be transferred, etc. The write and read operations to and from the addresses of the main memory serving as a storage for the information are carried out by chaining the CCWs to one another.

In this case channel command is specified by the first CCW and the memory locations where data is to be transferred is specified by the subsequent CCWs. The CCWs, together with other parameters, form a channel control block (CCB). The CCB is provided for each input/output device and each channel. The address table of the CCB is provided in a given system area of the memory. A start I/O instruction ( SIO instruction) is executed by the CPU, with parameters of the channel number and the I/O unit number so that a given CCB address is obtained from the given channel number and the I/O device number. A given CCB is read out from the address and its contents is set in the channel. Subsequently, the channel controls the input/output device on the basis of the information given so that data is transferred.

In the scheme thus far mentioned, however, the address of the CCB must be set in a predetermined system area of the MMU and this is defective to the effective utilization of the memory. The work to retrieve the CCB address table and the CCB address must be carried out in relation with the CPU and thus this deteriorates the CPU utilization.

SUMMARY OF THE INVENTION

Accordingly, the primary object of the invention is to provide an input/output control system and methods which are effectively used in the above-mentioned computer system. In the input/output control system according to the invention, an inventive architecture employing two separate buses extends the function of each bit, with improvement of the start and termination operations of the channel.

To achieve the object of the invention, there is provided an input/output control system having a plurality of input/output devices, a plurality of channels for controlling the plurality of input/output devices, a central processing unit for controlling the channels, and a main memory for storing instructions executed by the central processing unit to start the channels and the control information to control the plurality of input/output control devices, wherein the instruction to start the channels is comprised of: an operation code, a first operand for specifying the channel number for identifying any one of the channels and the device number for identifying any one of the input/output devices; and a second operand for specifying the memory address in which the control information is stored.

Other objects and features of the invention are apparent from the following description taken in connection with the accompanying drawings, in which:

BRIEF DESCRIPTION OF THE DRAWINGS

FIG. 2 shows a block diagram of a part of an arithmetic control unit in a central processing unit in FIG. 1;

FIGS. 9A to 9L show flowcharts for firmware processings after reading out of the channel control word;

FIG. 12 shows a flow chart for illustrating a basic operation of the function of a null code.

DETAILED DESCRIPTION OF THE PREFERRED EMBODIMENTS

Figure 1:
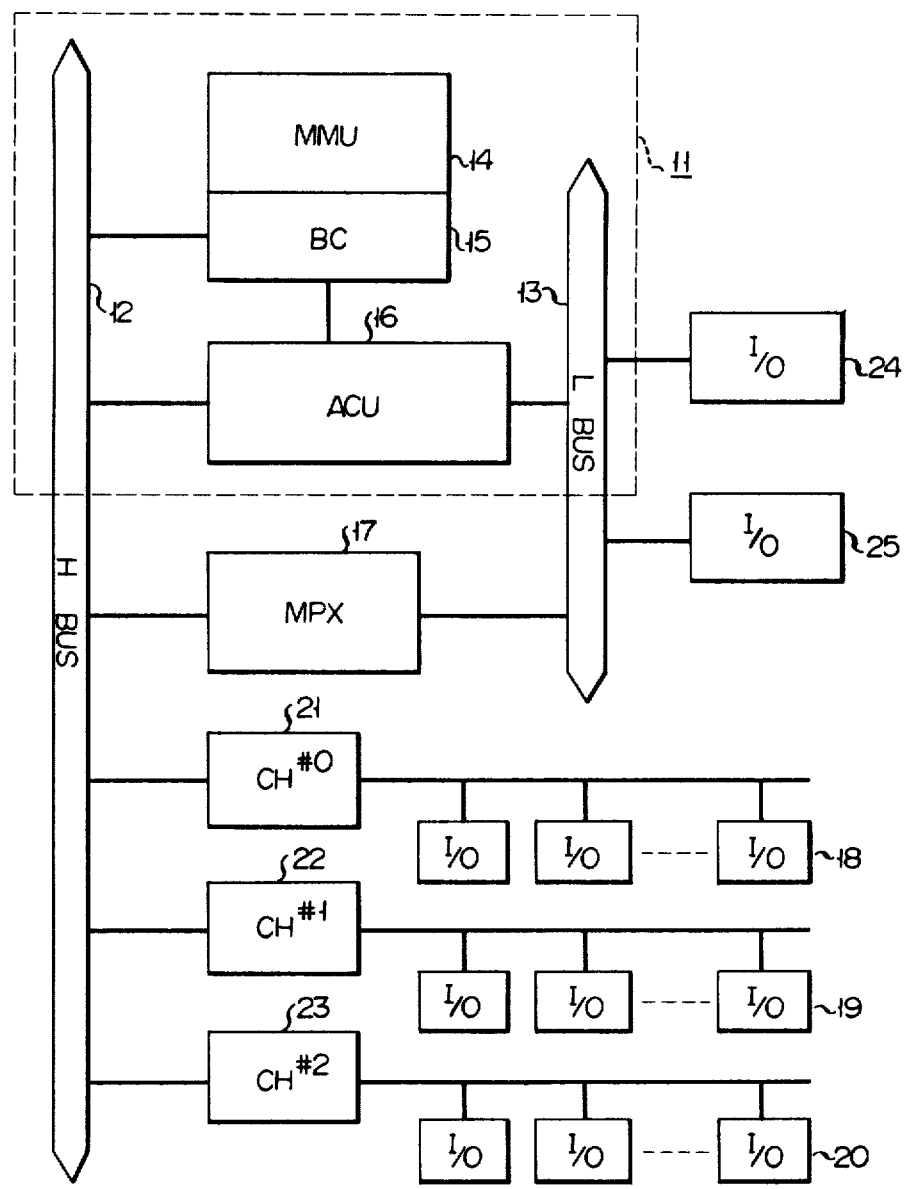
FIG. 1 shows a block diagram of an example of an information processing system into which an input/output control system according to the invention is incorporated.

Referring now to FIG. 1, there is shown an information processing system in which an input/output control system and methods according to the invention may be employed. In the figure, the central processing unit (CPU) 11, includes a high speed bus 12, a low speed bus 13, a main memory unit (MMU) 14, a bus controller 15, and an arithmetic and logic control unit 16. The high speed bus 12 has a data length of 32 bits, for example, and is bidirectional in data transfer at a high rate of speed. The high speed bus 12 is connected through the bus controller 15 to the main memory 14, and further to the arithmetic and logic control unit 16 and a multiplexer 17. The high speed bus 12 is also connected to high speed input/output devices 18 to 20, through the corresponding channels 21 to 23.

The low speed bus 13 has a data width of 8 to 16 bits and transfers data at a low speed. The low speed bus 13 is connected to input/output devices 24 and 25 for low speed, through which data transfer is carried out between the input/output devices 24 and 25 under control of the arithmetic and logic control unit 16. The low speed bus 13 is connected to the high speed bus 12 through the multiplexer 17 for effecting a multiplex input/output control under control of the arithmetic control unit 16.

Turning now to FIG. 2, there is illustrated the details of the arithmetic control unit 16 shown in FIG. 1. In the figure, an arithmetic logic unit (ALU) 46 executes various arithmetic operations and logic operations. The main memory unit MMU 31, which is connected to a main memory bus M-BUS 32, stores various programs and data. A memory address register MAR 34 is connected between the M-BUS 32 and a source bus S-BUS 33. The MAR 34 is used for loading the addresses of the MMU 31 into MMU 31. Between the M-BUS 32 and the S-BUS 33 is connected a memory data register MDR 35. The MDR 35 temporarily stores the data to be loaded or fetched to and from the MMU 31 in accordance with the address loaded in MAR 34. The MDR 35 is connected further to an instruction buffer bus IB-BUS 36.

An instruction buffer register IBR 37 is inserted between IB-BUS 36 and M-BUS 32. The IBR 37 temporarily stores an instruction code transferred from MMU 31. An instruction register IR 38 is inserted between S-BUS 33 and a destination bus B-BUS 39 and is connected to IB-BUS 36. The instruction code registered in IBR 37 is loaded through IB-BUS 36 to IR 38. An instruction decoding unit IDU 40, connected to IB-BUS 36, decodes the instruction stored in IR 38. A microprogram control unit MCU 41 interconnected to IDU 40 and is connected to IR 38. MCU 41 responds to a command from IDU 40 to control the operation of the microprogram. A read only memory address register RAR 42 is connected to IR 38 and stores an address of a read only memory ROM 43 (to be referred to below) outputted from IR 38.

The read only memory ROM 43 is connected to RAR 42 and stores the microprogram and produces a microinstruction stored in the address registered in RAR 42 under control of MCU 41. The microinstruction outputted is registered in a read only memory data register RDR 44 connecting to ROM 43.

A general register set 45 intervenes between S-BUS 33 and B-BUS 39 and is comprised of 16 registers GR 0 to GR 15. Registers GR 0 to GR 8 are used as arithmetic registers or data registers and remaining registers GR 9 to GR 15 as index registers, for example. The arithmetic and logic unit ALU 46 is coupled with the B-BUS 39 and the general register set 45 and to a quotient register QR (described later) 47 and executes various arithmetic operations and logic operations. The quotient register QR 47 is connected to S-BUS 33 and ALU 46 and temporarily stores the contents before operation and the contents after operation.

A program status word PSW 48 is connected to S-BUS 33 and B-BUS 39 and is a register of 64 bits for storing an execution condition (inhibition of interruption/permission of the same) of a program, a status and the like. The program status word is comprised of a status field, a condition code field and a location field. A location counter 49 for storing an execution address of a program is connected to S-BUS 33 and B-BUS 39. A base register set 50, connected to S-BUS 33 and B-BUS 39, is comprised of eight registers BR 0 to BR 7. The base register set 50 is a register for registering a base address. The base address is used as a means to specify individual programs or a data area, independently. A working register (WR) 51, which is connected to S-BUS 33 and B-BUS 39, serves as a temporary buffer when the microinstruction of the microprogram is executed.

Figure 3:
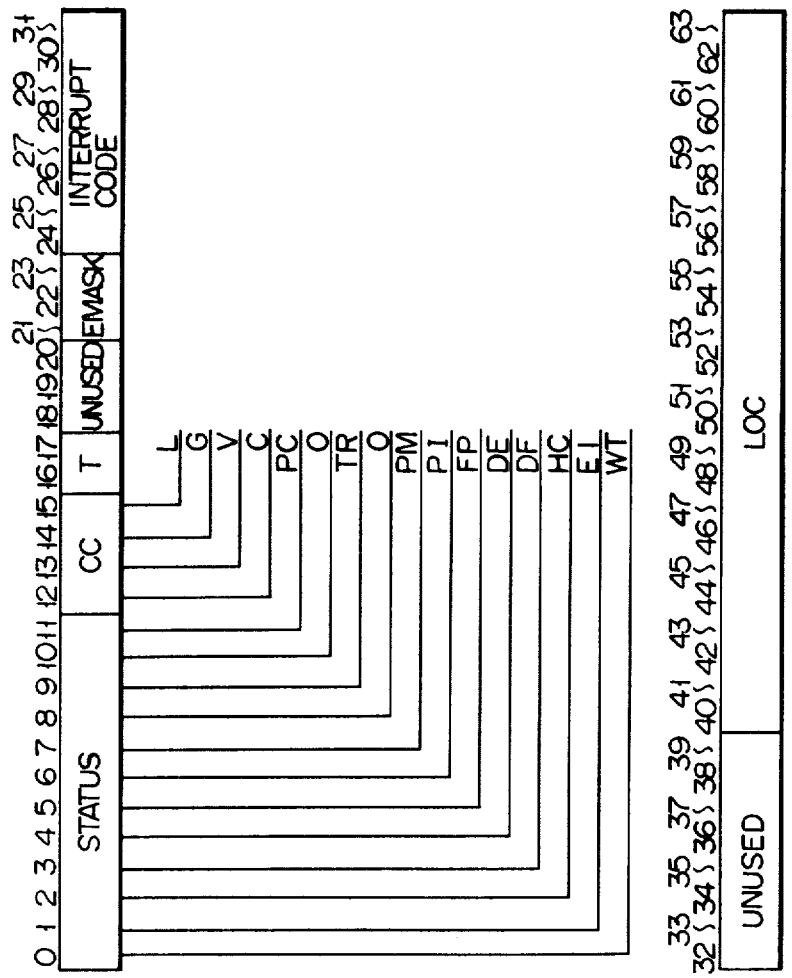
FIG. 3 shows a format of a program status word.

FIG. 3 shows a format of a program status word PSW of 64 bits length which is divided into a status field, a condition field, and a location field. The status field is comprised of 12 bits and the functions of the respective bits are as follows:

Bit 0 (WT): This represents a wait state of the CPU, and when the bit is "1", the CPU is in a wait state.

Bit 1 (EI): This represents an interrupt enable. When this bit is "0", an interruption generated by a peripheral device is rejected. When the bit 1 is "1", the interruption is accepted.

Bit 2 (HC): This bit represents a hardware check. When the bit is "1", a piece of hardware is abnormal. An interruption generated when a failure occurs codes the abnormal locations in the power source, the memory, the data bus and the like, and the coded ones are set in a specified location of the memory.

Bit 3 (DF): This bit represents a fixed-point divide error. When the bits is "1", if the fixed point divide error interruption takes place, the interruption is accepted. When it is "0", such an interruption is not accepted.

Bit 4 (DE): This bit represents a decimal operation error. When this bit is "1", if the decimal operation error interruption such as overflow takes place, the interruption is accepted. When it is "0", such an interruption is rejected.

Bit 5 (FP): This bit represents a floating point divide error. When the bit is "1", if the floating point divide error interruption takes place, the interruption is accepted. When it is "0", such an interruption is not accepted.

Bit 6 (PI): This bit represents a privileged instruction. This instruction includes ones for executing all the functions of the hardware such as access to the register unusable by a user, input and output instructions, stoppage of the arithmetic control unit, and the like. When the bit is "1", the instruction being currently executed by the CPU is the privileged instruction.

Bit 7 (PM): This bit is a protect mode. When this bit is "1" if the protect mode interruption occurs, the interruption is accepted. When it is "0", such an interruption is rejected.

Bit 8 (O): This bit is unused.

Bit 9 (TR): This bit represents a trace mode. When this bit is "1", if a jump instruction appears in the program being now executed, the location of the jump instruction is stored. This instruction is used mainly for an operation such as debugging maintenance.

Bit 10 (O): This bit is unused.

Bit 11 (PC): This bit represents a program check. When this bit is "1", it indicates trouble in the program. Interruption generated when the trouble or abnormality is detected codes trouble factors of the program and the coded one is set in a specified address.

The condition code field is of 4-bit length, and represents the results of the operation for each instruction. The respective bits of the condition code field have the following meanings.

Bit 12: This bit is indicative of a carry flag. "1" of this bit indicates a carry occurs.

Bit 13: This is an overflow flag. "1" of this bit indicates an overflow occurs.

Bit 14: This is a positive flag of which "1" indicates a value is positive.

Bit 15: This is a negative flag of which "1" indicates a value is negative.

When the bits 14 and 15 are both "0", a value is "0".

Bits 16 and 17: These bits are assigned for a timer T.

Bits 18 to 20: Unused.

Bits 21 to 23: These are assigned to EMASK bits and represent mask bits for the control of a priority interrupt for the termination interrupt.

Bits 24 to 31: These are assigned to interrupt code. When an interruption occurs, the kind of the interruption is coded and set by the CPU. A hardware check, a program check, a superviser call and the like are examples of interruptions coded.

Bits 32 to 39: Unused.

Bits 40 to 63: These are assigned for a location field. The location field holds a storing address of the instruction being currently executed by the CPU. Upon completion of the execution, it holds the address of an instruction to be executed next.

Figure 4:
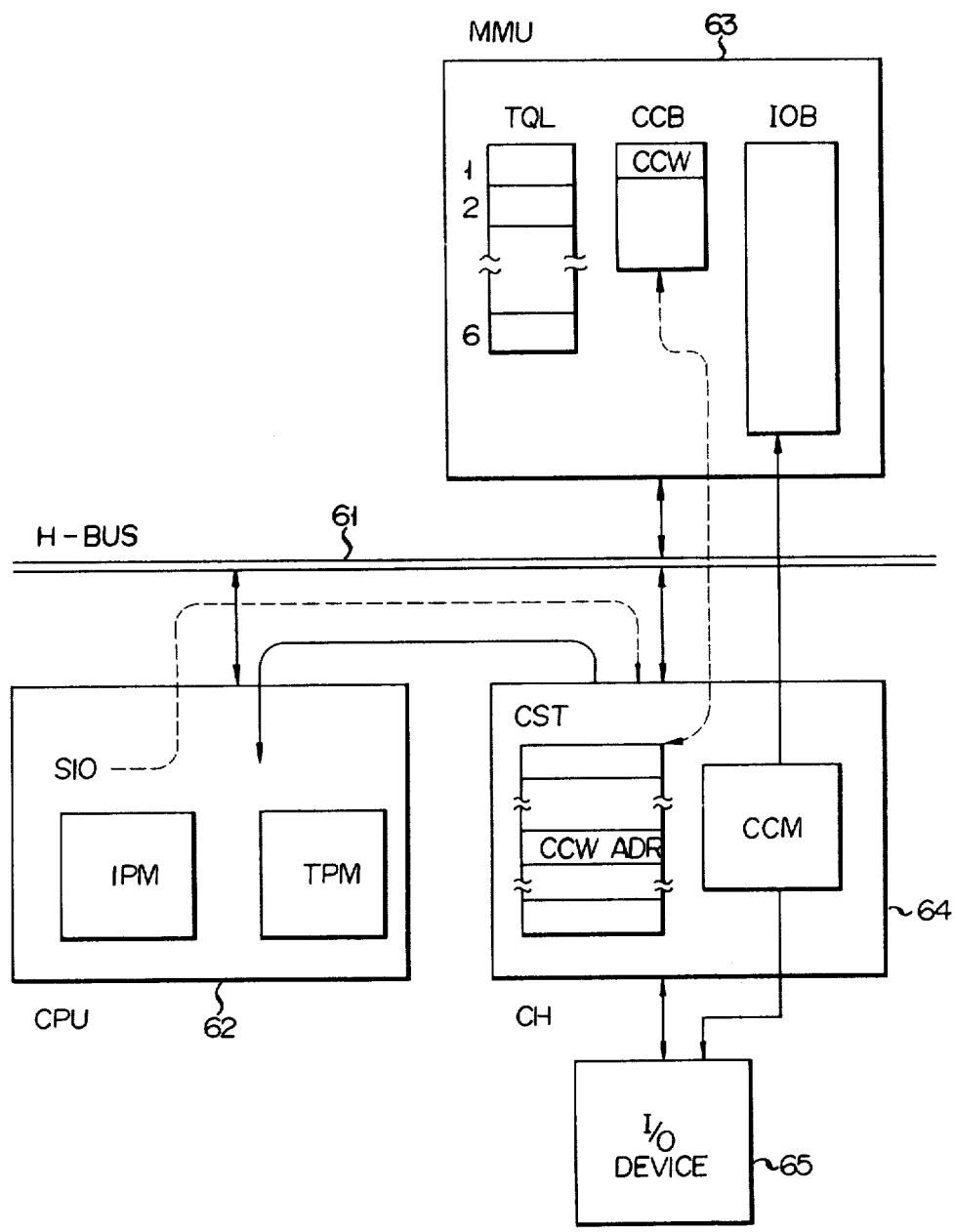
FIG. 4 schematically illustrates a channel control operation into which an input/output control system according to the invention is incorporated.

FIG. 4 which will now be described schematically illustrates the concept of a channel control operation in accordance with an input/output control system of the invention. In the figure, to H-BUS 61 are connected CPU 62, MMU 63 and a channel 64. A data transfer between the input/output device 65 and MMU 63 is controlled by the channel 64. The data transfer is started in response to a start input/output instruction SIO (START I/O) from CPU 62. Channel command words necessary for a device (peripheral device) to be started are formed by one or a plurality of blocks (this block is called a channel control block) and the channel control block is set in MMU 63. The channel command word represents the information of an input/output method of the channel and the input/output devices. Through the execution of the SIO instruction by CPU 62, the channel command word stored in MMU 63 is analyzed and processed. When CPU 62 starts the channel 64, it first transfers a CCB address to the channel 64. The CCB address is a memory address storing CCB. Upon receipt of the CCB address, the channel 64 reads out the CCB from the corresponding address of MMU 62 and puts it in a service table CST. The input and output processing is carried out in accordance with the contents of the service table CST.

Upon the completion of the input/output processing, the channel 64 writes into the CCB storing location, the channel status, the input/output device status and the like, and services an interrupt for CPU so that it transfers the CCB address and a queue number to CPU 62. In response to the interruption, CPU 62 loads the CCB address in the corresponding number in a termination queue list in MMU 63 and generates a channel terminal interruption. Upon the interruption, the program reads out the CCB address from the terminal queue list (TQL) in accordance with a list instruction and makes necessary checks such as a status of the channel having completed its operation or the status of the input/output device. The construction of the termination queue is of the list structure and having six queues numbered 1 to 6. The queue number which is to be registered at the end of the operation, is designated by the SIO instruction or the chain information of CCB. The termination interrupt is generated when data is stored in the termination queue list and is masked by EMASK of PSW. The operations of the input/output buffer (IOB), an instruction processing mechanism (IPM), termination processing mechanism (TPM) and a channel control mechanism (CCM) will be described later.

There are 16 channel control blocks and these blocks are identified by channel command identifying numbers specified by the upper four bits in the channel command word. The channel control blocks numbered 0 and 1 have standard channel functions. Before proceeding with the operations and functions of the standard channel functions, explanation will be described of the format of an instruction used in the channel control.

Figure 5A:
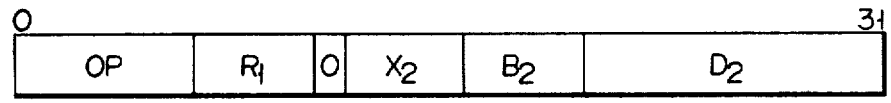
FIG. 5A shows a format of a start input/output instruction (SIO) for input/output devices.
Figure 5A:
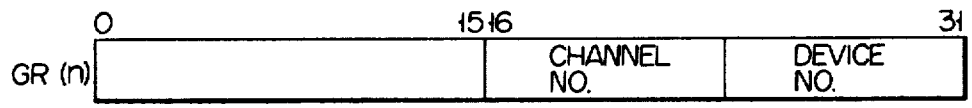
Figure 5A:
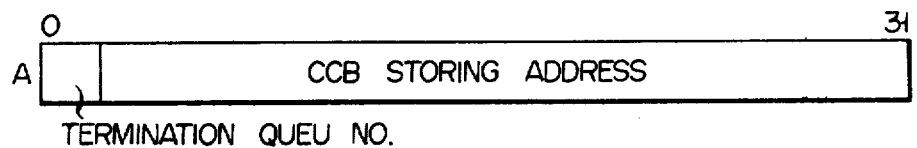
Figure 5B:
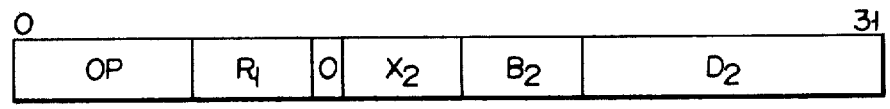
FIG. 5B shows a format of a termination input/output instruction (TIO) for input/output devices.
Figure 5B:
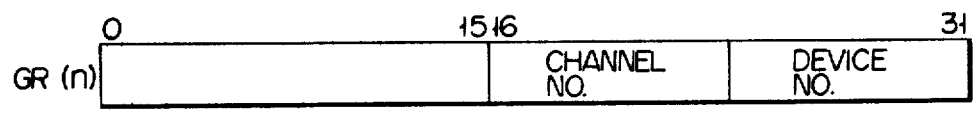
Figure 5B:
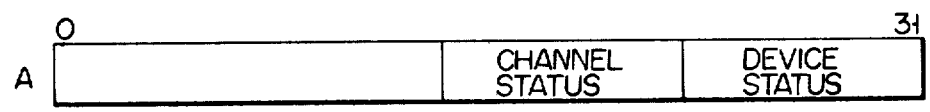

The format of the SIO instruction is illustrated in FIG. 5A and the format of the TIO instruction in FIG. 5B. Both the instructions consist of an operation code part OP, a first operand R1, an address modification judging bit 0, and a second operand including an index address modification field X2, a base address modification field B2, and a displacement D2.

The first operand designates any one of general registers GR 0 to GR 8; the index address modification fields X2 designates any one of index registers GR 9 to GR 15; the base address modification field B2 designates any one of base address registers BR1 to BR7; the displacement D2 designates a logic address. The general register GR (n) specified by the first operand R1 specifies the SIO instruction, the TIO instruction, the channel number and the device number. An address (A) formed by the displacement D2, the index address modification field X2, and the base address modification field B2, designates the channel control data.

In the SIO instruction, the channel control data are the termination queue number and the CCB storing address. In the TIO instruction, the data are a channel status and an input/output status.

Accordingly, when the SIO instruction is executed by the CPU, the CPU transfers the channel control data (termination queue number and CCB address, i.e. 32 bits) designated by the second operand to the channel and the device designated by the first operand. When the data is correctly transferred to the channel, the bit V in the condition code field of PSW is set "1" or "0". When the input/output device designated is inoperable due to failure or the like, the channel termination interrupt occurs.

In this case, when the TIO instruction is executed by the CPU, the CPU receives the status codes from the channel and the input/output devices designated by the first operand and loads them into the addresses designated by the second operand. At this time, when the bit V of the condition code is "0", it indicates the operation has been completed correctly. On the other hand, when the bit V is "1", it indicates that the channel is not yet connected.

When the HIO instruction is executed by the CPU, the CPU stops the operation of the channel designated by the first operand or the input/output device connected to it. When the bit V of the condition code is "0", it indicates that the operation has been completed correctly. When the bit V is "1", it indicates that the channel is not yet connected. These instructions, SIO, HIO and TIO are generally called privileged instructions.

Figures 6, 7:
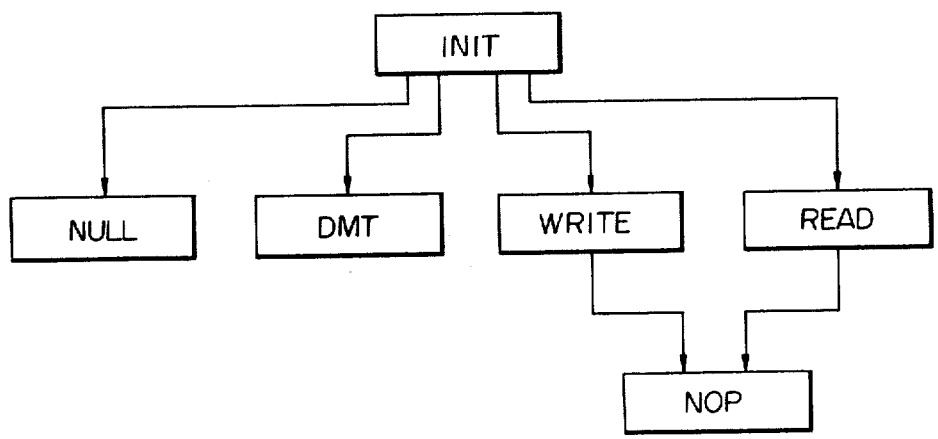
FIG. 6 shows a format of a channel control block.
FIG. 7 shows status transfers of NOP mode, INIT mode, READ mode, WRITE mode, DMT mode and NULL mode.

In FIG. 6, the CCB shown is stored in the MMU and contains the information representing an input/output processing method of the channel or the input/output device. The channel control block has the following items.

Channel Number: When the termination interrupt is produced, the channel number of the interrupt producing channel is stored.

Device Number: When the termination interruption takes place, the input/output device number of the interrupt producing device is stored.

Channel Status: When the channel interrupt is produced, the channel status of the interrupt producing source is stored.

Device Status: When the termination interrupt is generated, the device status of the interrupt generating source is stored.

Queue Number: When CCB changes by the chain function of CCW, it is possible to change the termination queue number and this queue number is stored.

Chain Address: When CCB is changed by the chain function of CCW, a new CCB location is designated.

Command: When the command output is designated by CCW, the command data specified here is outputted.

Termination Character: When the termination character is specified by CCW, data specified here operates as a termination character upon the input/output operation.

Transfer Byte Number: The byte number of data transferred between the MMU and the input/output device is specified.

Start Address/Count: The head location and the size of the input/output buffer (I/O buffer) or the head location and the size of the input/output device control buffer are specified.

Code Conversion Table Address: When the code conversion is specified for the input/output data, the code conversion is carried out through the code conversion table. In this case, the memory address where the code conversion table of 256 bits is stored, is specified.

CCW: This is constructed of 32 bits and the bit construction is as shown in Table 1.

TABLE 1

| Bit | Function | Bit | Function |
| --- | --- | --- | --- |
| 0 | Command Identification | 16 | Continuation |
| 1 | | 17 | Queue |
| 2 | | 18 | Unused |
| 3 | | 19 | Status Error Flag |
| 4 | Command | 20 | Transfer Byte Number N |
| 5 | | 21 | |
| 6 | | 22 | |
| 7 | | 23 | |
| 8 | Command | 24 | Chain Address I |
| 9 | Device Control | 25 | |
| 10 | Null Code | 26 | |
| 11 | Code Conversion | 27 | |
| 12 | Termination Character | 28 | |
| 13 | Chain I | 29 | |
| 14 | Chain II | 30 | |
| 15 | Device Alternation | 31 | |

The explanation to follow is the function of each bit of CCW.

Bits 0 to 3: These bits are used to identify commands. This command identifying field is used to select a high speed bus (H bus) or an input/output bus (L bus).

Bits 4 to 7: These bits are assigned to a command. This command field designates six operation modes; INIT mode, NULL mode, DMT mode, READ mode, WRITE mode, and NOP mode. The phase transfers of these modes are as shown in FIG. 7.

Figure 8:
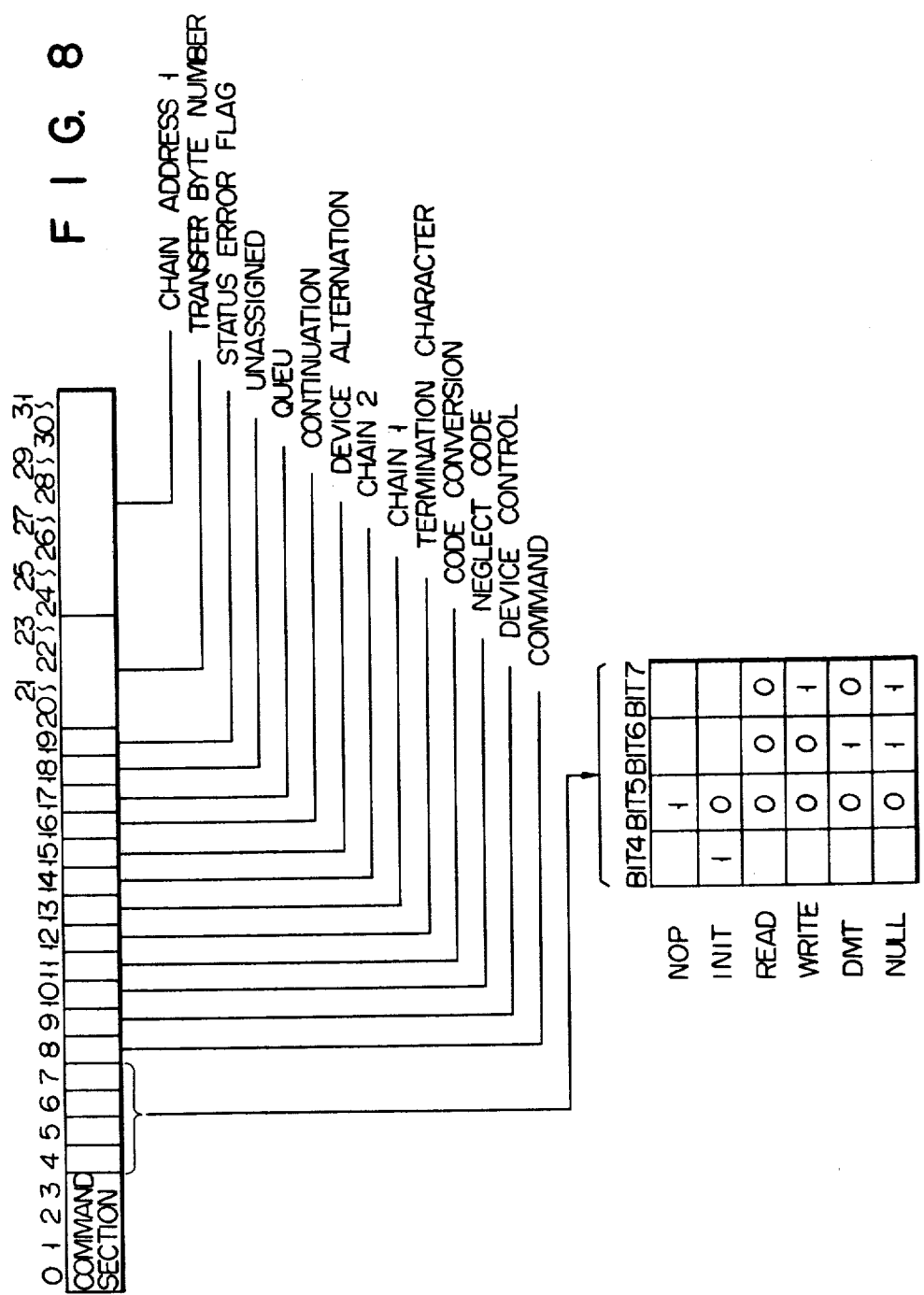
FIGS. 8 shows a format of a channel control word.

As shown in the figure, the phase of INIT mode may be transferred to the phases of WRITE mode, READ mode, NULL mode and DMT mode. Further, the phases of WRITE and READ modes may be transferred to NOP mode phase. The bit assignment of each mode is as shown in FIG. 8. As shown, when the bit 5 is "1", the mode is NOP irrespective of the state of the remaining bits in the command field. When the bit 4 is "1" and the bit 5 is "0", the mode is INIT. When the bits 5 to 7 are "0", the mode is READ. When the bits 5 and 6 are "0" and the bit 7 is "1", the mode is WRITE. When the bit 5 is "0", the bit 6 is "1", and the bit 7 is "0", the mode is DMT. When the bit 5 is "0" and the bits 6 and 7 are "1", the mode is NULL.

How the I/O channel processes in accordance with the commands will be described with reference to FIGS. 9A to 9L illustrating flow charts.

As shown in FIG. 9A, the channel at the initial state is in an idle state. The idle state is a called wait state and in this state the channel is not operated.

Then, when the CPU makes the channel start (i.e. CPU executes the SIO instruction), a specified device number, a specified channel number and a specified CCB address number are given to the channel. The channel control block is read out from the memory and is set in the channel service table in the channel. When the channel is not started by the CPU, the CPU checks to see if the I/O device produces an interrupt request signal of data transfer toward the channel. If the interrupt request signal is produced, the channel accepts the interrupt and reads out the device number. When no interrupt request signal is generated, the channel is in an idle state until the CPU drives the channel to start or the I/O device produces an interrupt signal.

Figure 9B:
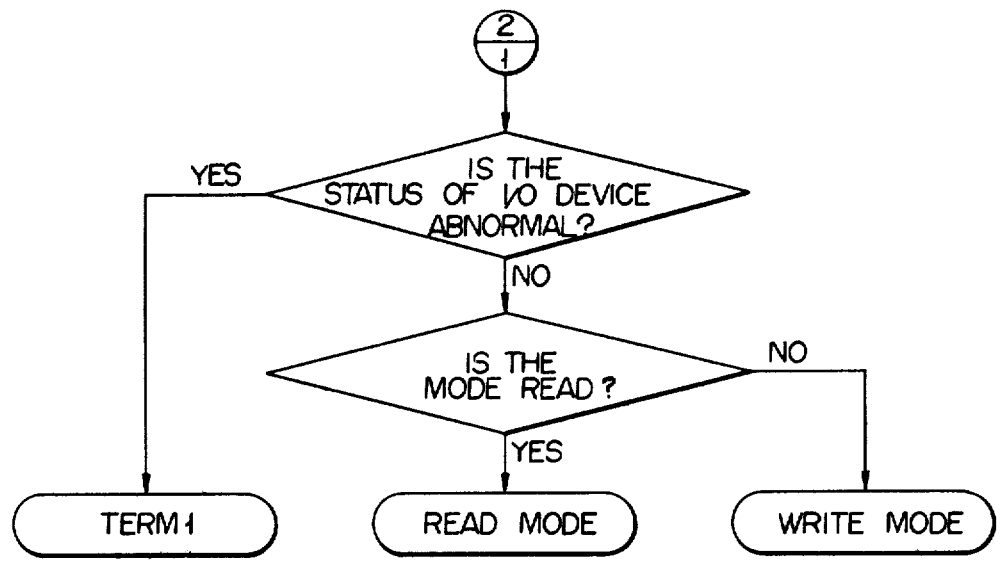
Figure 9B:
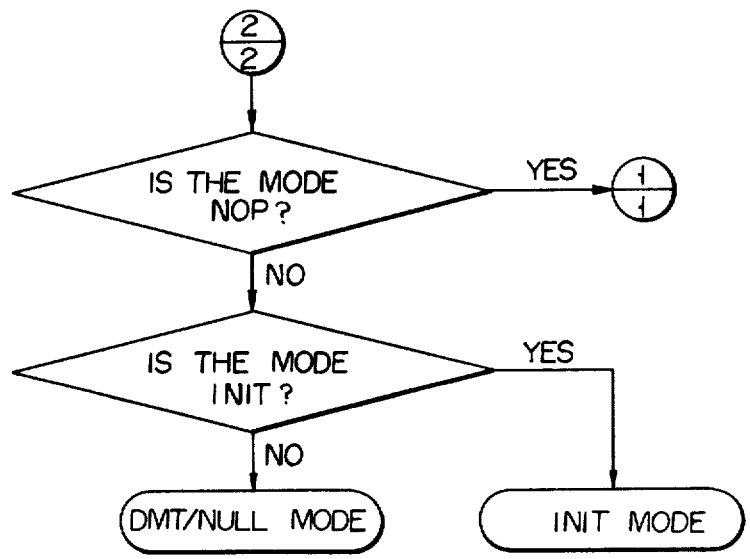

When the CCB is set in the channel service table, the channel reads out the CCB from the channel service table and subsequently operates in accordance with the contents of the service table. The channel decodes the channel command word in the channel control block. In other words, the command field (bits 4 to 7) in the channel command word is checked to find what mode (READ, WRITE, INIT or DMT/NULL mode) is specified. When any one of three bits from bits 4 to 6 in the bits 4 to 7 of CCW is "1", the operation mode is any one of the modes NOP, INIT DMT and NULL. When the bits 4 to 6 are all "0", the operation mode is READ or WRITE mode. When READ or WRITE mode is designated by the instruction field, the status of the I/O device designated by the channel number and the device number is checked to see as to whether the I/O device is normal or not, as shown in FIG. 9B. If it is normal, it is judged as to whether the mode is READ or WRITE and the CPU shifts to the step of mode processing. If it is abnormal, the CPU steps to the processing of TERM 1.

Figure 9C:
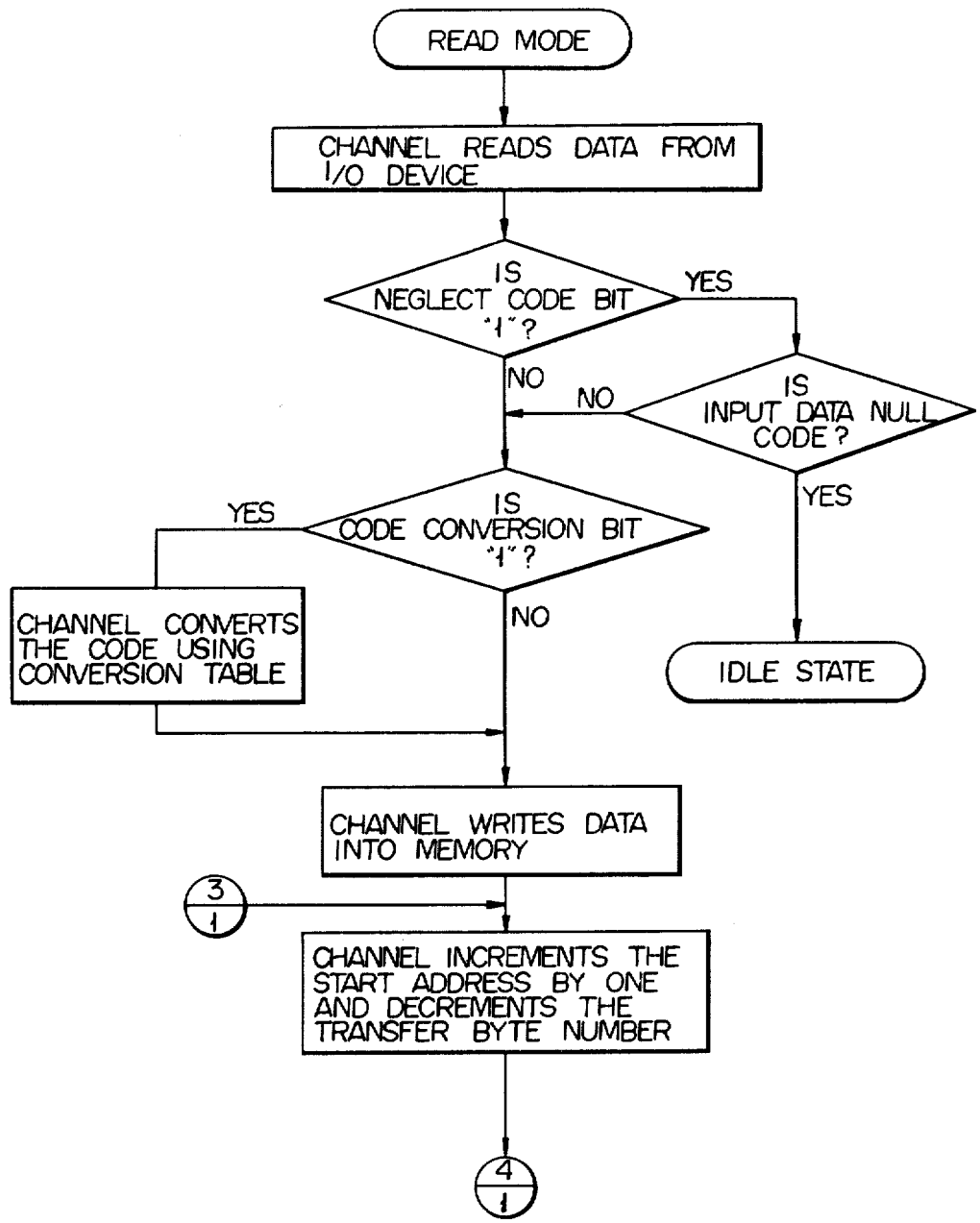

In READ mode, the channel reads out one byte of data from the I/O device, as shown in FIG. 9C. At this time, when the neglect code bit (bit 10) of the channel command word is designated, it is checked whether the data read out is a null code in this example, "00" (hexadecimal) or "FF" (hexadecimal) or not. If it is the null code, the channel enters an idle state without writing the data into the memory.

If the null code or the neglect code is not specified, the channel checks to see if the code conversion designation (when the bit 11 of the channel command word is turned on) is made or not. When the code conversion is designated, the code is converted and then is loaded into the memory. When the code conversion is not designated, the code is loaded into the memory without being converted. Then, the start address is incremented by one and the transfer byte number is decremented by one. As shown in FIG. 9D, the channel checks to see if the transfer byte number is zero or not. If it is zero, the channel advances to the step TERM 1. If it is not zero, the channel checks to see if the termination character bit (bit 12 of the channel command word) is designated or not. If it is not designated, the channel advances to the idle state. If it is designated, the channel checks to see if the data loaded is the termination character or not. If the data is the termination character, the channel shifts to the step of TERM 1. If the data is not the termination character, it returns to the idle state.

Figure 9E:
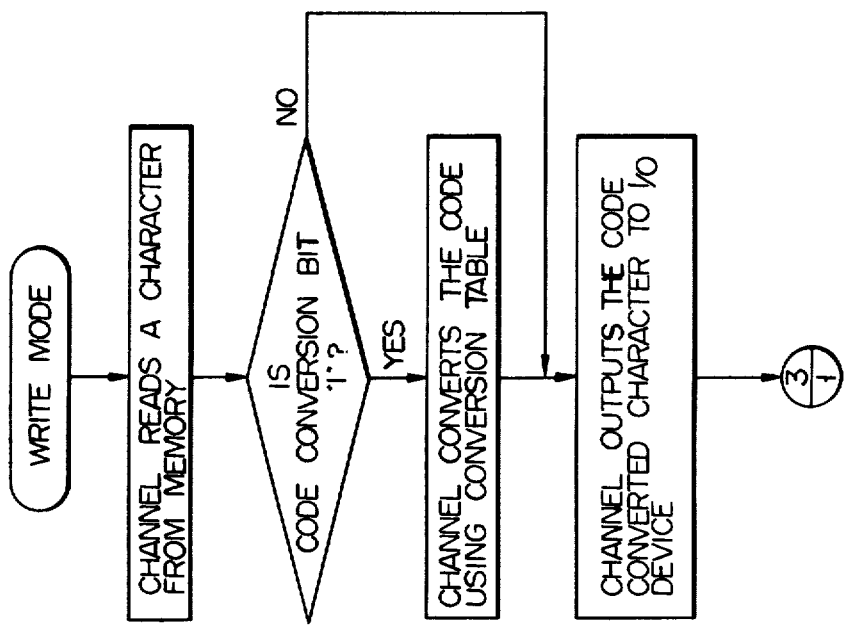
Figure 9D:
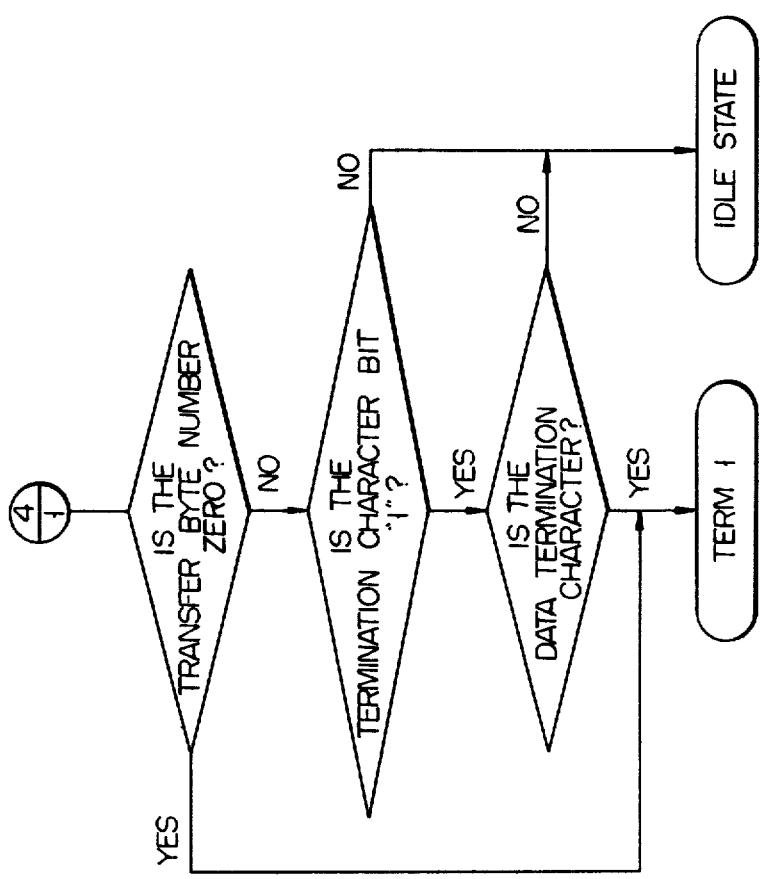

In WRITE mode, the channel reads out one character of data from the main memory, as shown in FIG. 9E. If the code conversion is designated, the channel executes the code conversion of the one character data, referring to the code conversion table. If the code conversion is not designated, the channel produces the character data to a given I/O device, without code conversion. Subsequently, as in the read mode, the start address is incremented, the transfer byte number is decremented, the transfer byte number is checked and the designation of the termination character is checked.

Figure 9F:
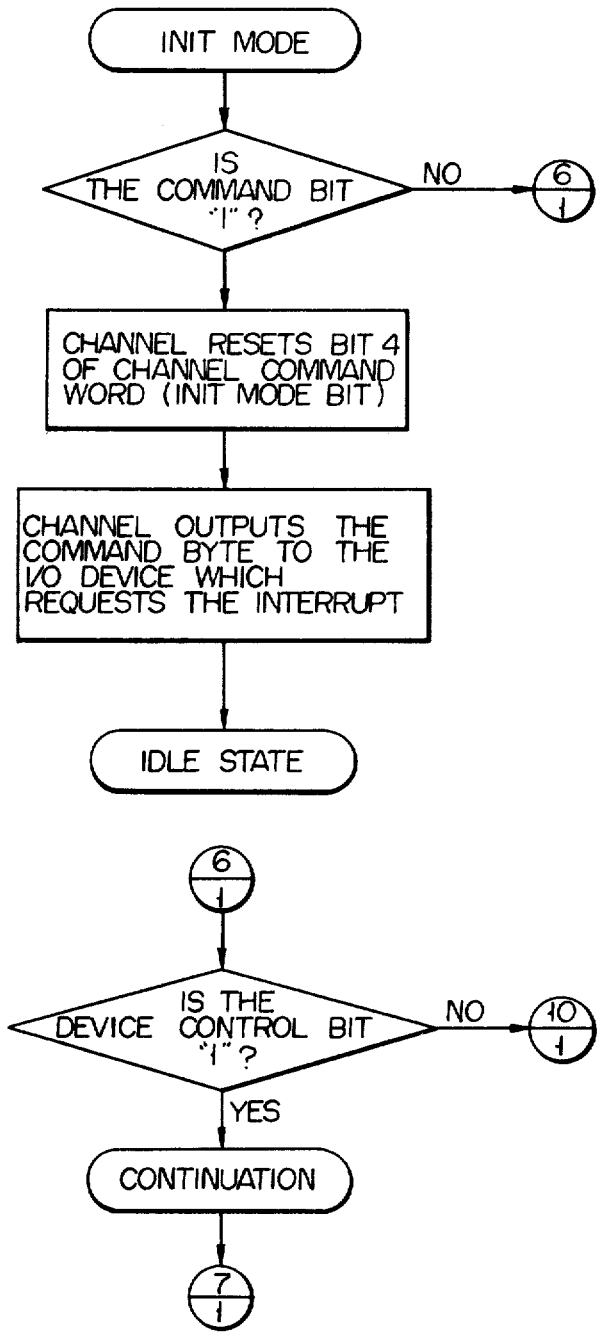
Figure 9G:
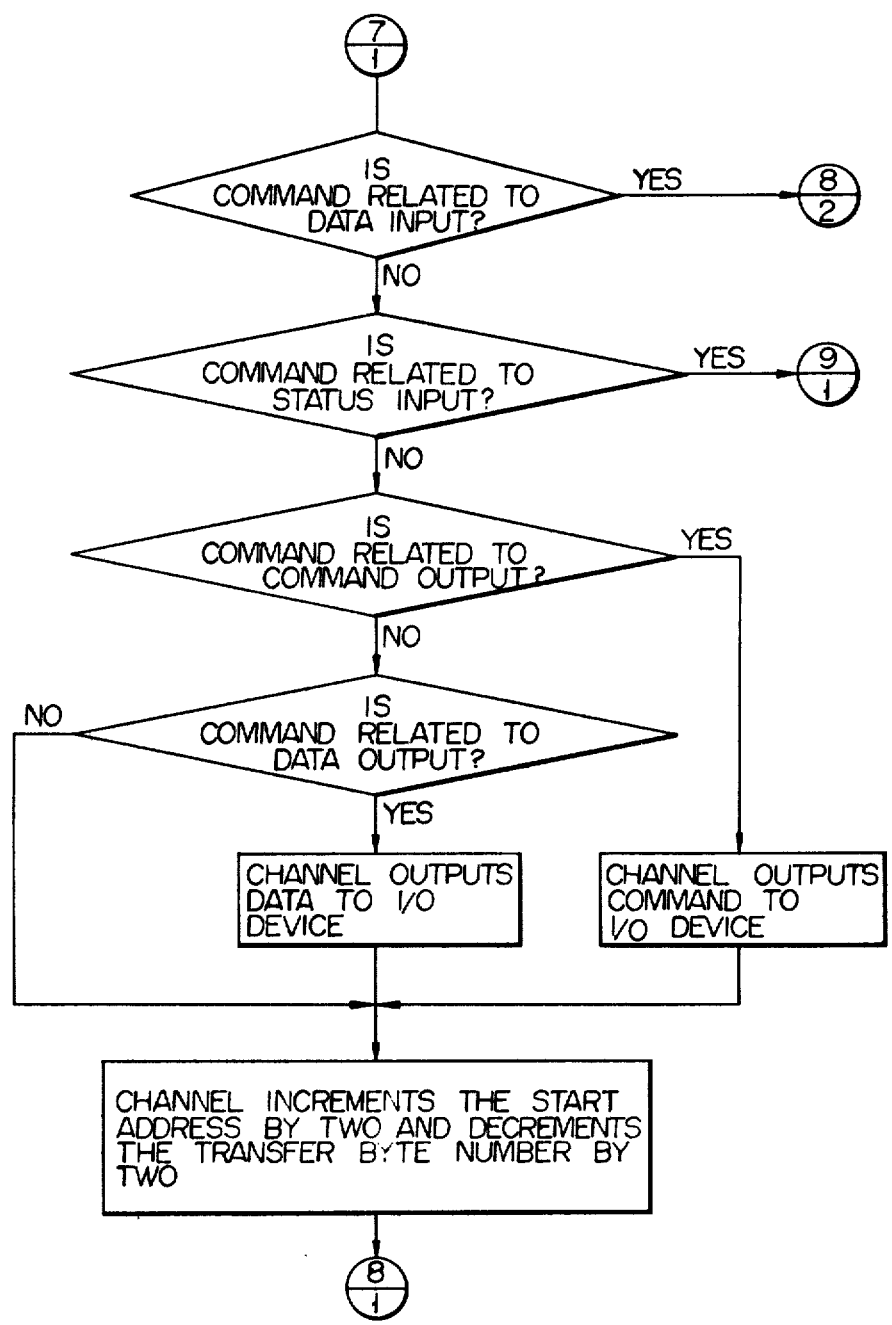

When the INIT mode is designated by the command field in the channel command word, the channel first checks to see if the command (the bit 8 in the channel command word) is designated or not, as shown in FIG. 9F. When it is designated, the bit 4 of the channel command word (when this bit is ON, the operation mode is INIT mode) is reset, the channel produces the command byte in the channel command word toward the I/O device and then becomes in the idle state.

On the other hand, when the command is not designated, the channel checks to see if the device control (bit 9 of the channel command word) is designated or not. If it is designated, the channel shifts to a continuation state. If it is not designated, the channel shifts to a DMT/NULL mode to be described later. The continuous state judges the kind of the instruction designation shown in Table 2 (to be given later). The instruction designations are roughly divided into four; inputting of data, inputting of status, outputting of command, and outputting of data.

The inputting of data in the instruction designation is further divided in the following. Data is inputted and set in the data field. Data is inputted and it is ANDed with the data field, and if the result of the AND operation is TRUE, the processing of the control data is ended while, if it is FALSE, the processing is continued. Data is inputted and is ANDed with the data field and if the result of the AND operation is TRUE, the processing is continued while if it is FALSE, the control data processing is completed. The inputting of status also is further divided into the following cases. Status is inputted and is set in the data field. Status is inputted and is ANDed with the data field, and if the result of the AND operation is TRUE, the processing of the control data is ended while if it is FALSE, the processing is continued. Status is inputted and is ANDed with the data field, if the result of the AND operation is TRUE, the processing is continued while if it is FALSE, the processing of control data is completed. In the command field, there is a case where the data field is outputted as a command. Further, in the case of the outputting of data, data is outputted as a data field. As described above, in the case of the command relating to the data input, the channel inputs data (command) as shown in FIG. 9H, and the data inputted is checked as to whether it is accompanied by data check. If it is the data (command) with the data check, the channel shifts to the processing of MASK. On the other hand, if the data is not accompanied by data check, that is to say, in the case where the data is inputted and is set in the data field, the channel checks to see whether the transfer byte number is zero or not. If it is zero, the channel shifts to the step of TERM 1. If it is not zero, the channel checks to see if there is a continuation designation in the channel command word or not. If there is no continuous designation, the channel advances to the IDLE state. If there is a continuous designation, the channel advances to the continuous processing.

Figure 9I:
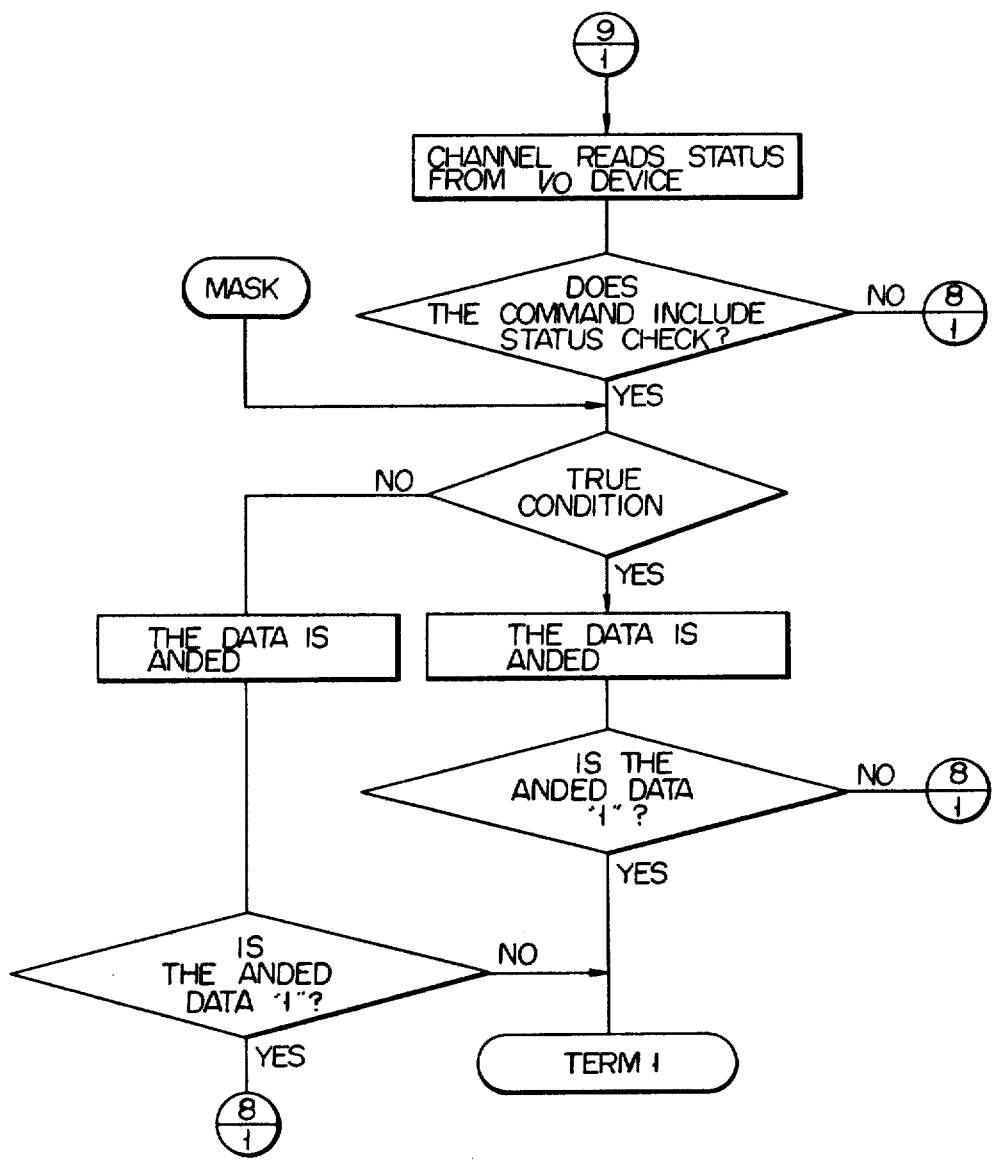

In the case of the command relating to the status input, the channel reads out the status word from the input/output device, as shown in FIG. 9I. If the status word is not accompanied by the status check, that is to say, when the status is inputted and set in the data field, the channel operation returns to a routine to check to see if the transfer byte is zero or not.

On the other hand, if the status word is accompanied by the status check, the process to be executed is two ways, as mentioned above. It is further checked whether the data (command) satisfies the TRUE condition or not. Through this check, it is judged what the data (command) is. If the data satisfies the TRUE condition, it is ANDed with the data field. When the result of the AND operation is TRUE, the channel operation advances to the processing of TERM 1. On the other hand, the processing of the control data is completed, and the channel returns to the routine to check to see if the transfer byte number is zero or not.

When the data (command) is not TRUE, it is ANDed with the data field and if the result of it is TRUE, the control data processing is completed and the channel operation returns to the routine to check to see if the transfer byte number is zero or not.

When the result of the AND operation of the data (command) with the data field is not TRUE, the channel operation shifts to the processing of TERM 1.

Figure 9J:
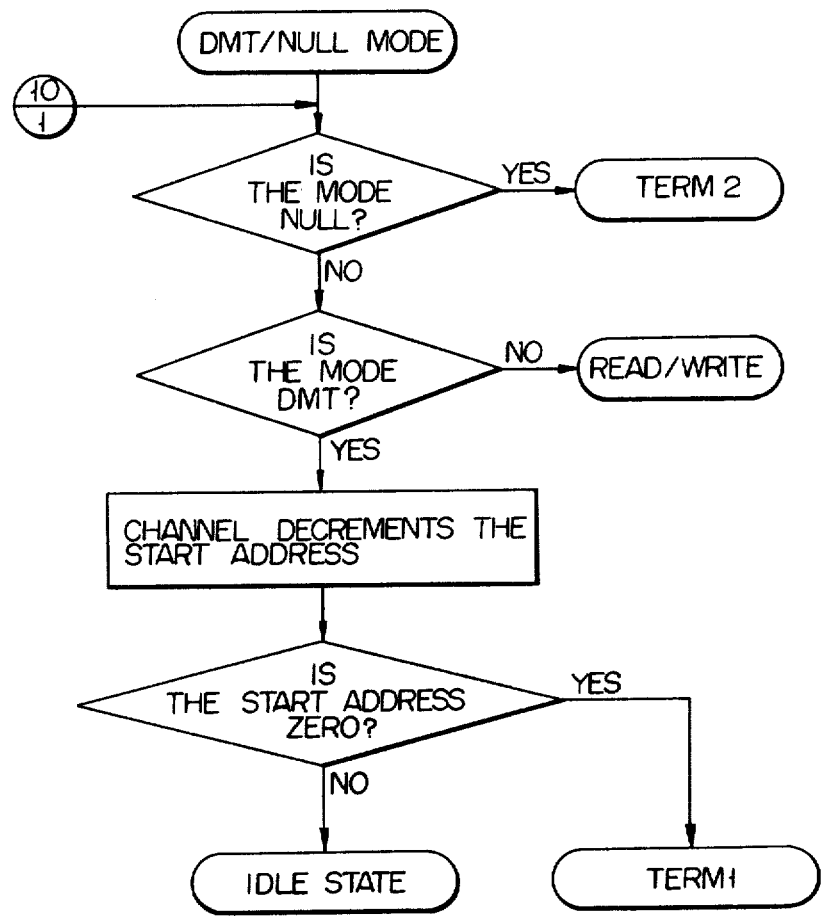

When DMT/NULL mode is specified by the command field in the channel command word, whether the mode is NULL or not is first checked as shown in FIG. 9J. If it is NULL mode, the channel operation shifts to the processing of TERM 2. When it is DMT mode, the start address is decremented by one and if the start address is zero, the processing of TERM 1 is executed. If it is not zero, the channel shifts to the IDLE state. When neither NULL mode or DMT mode is designated, the operation shifts to READ/WRITE mode.

Figure 9K:
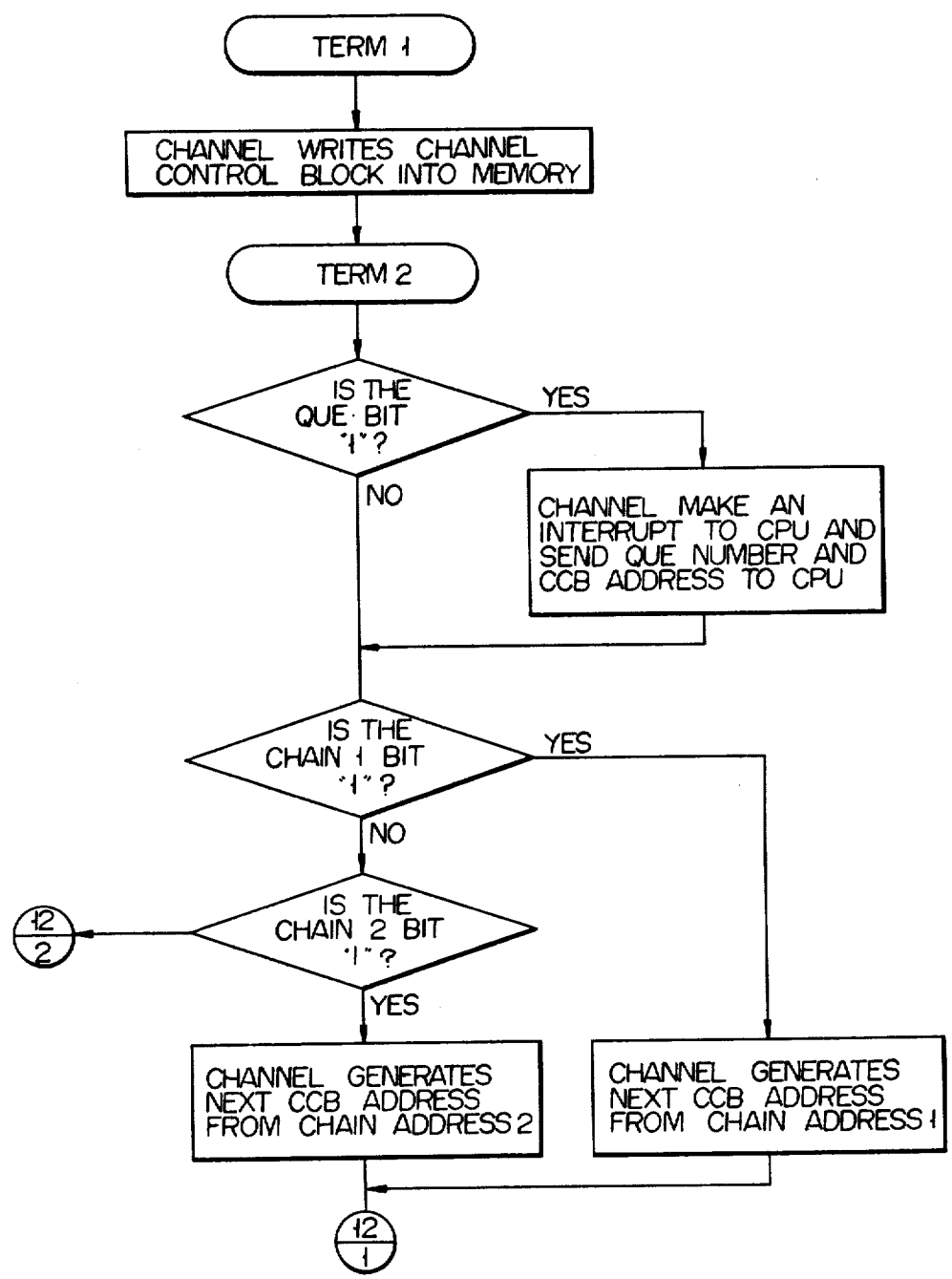
Figure 9L:
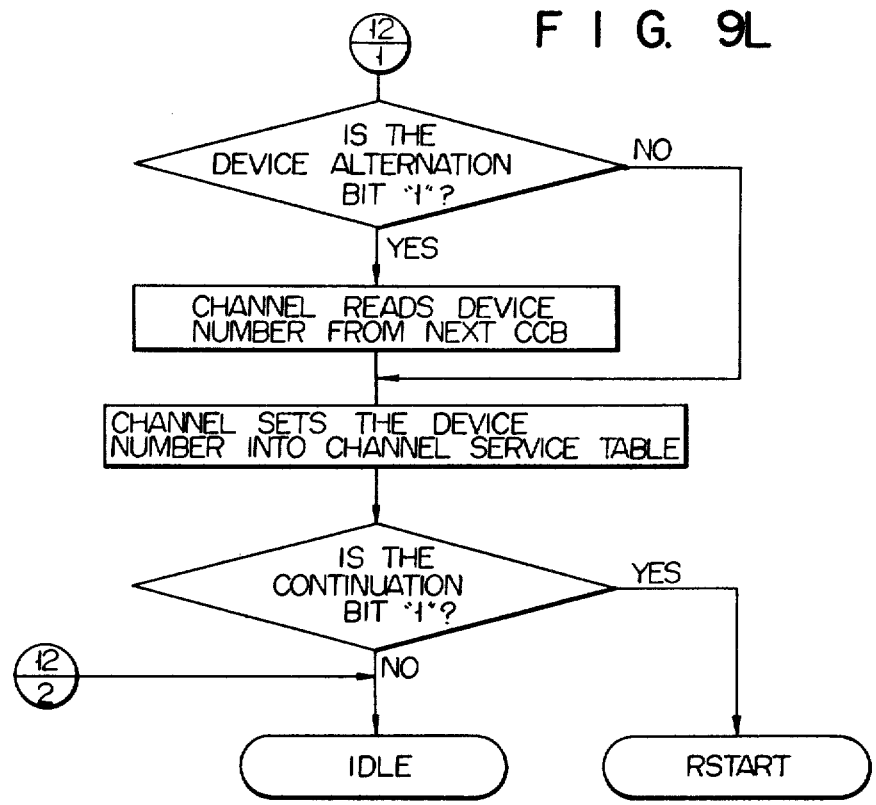

In the processing of TERM 1, the channel first writes the channel control block into the memory, and shifts to the processing of the TERM 2, as shown in FIG. 9K. In the processing of TERM 2, it is checked to see whether the QUEUE bit is ON or not. If it is ON, the channel makes an interrupt to CPU and sends the QUEUE number and the CCB address to CPU. Then, the CPU registers them into the termination que list.

When there is no QUEUE designation, the respective bits in CHAIN 1 and CHAIN 2 are checked. If the CHAIN 1 bit is ON, the channel produces the succeeding CCB address from the chain address 1. When the CHAIN 2 bit is ON, the channel produces the succeeding CCB address from the chain address 2, and then checks whether there is the device alternation designation (bit 15 of the channel command word) or not. When the device alternation designation exists, the channel reads the device number from the succeeding CCB.

Subsequently, the channel sets the device number into the channel service table, as in the case of no device alternation designation. Then, whether the device alternation designation (bit 15 of the channel command word) is made or not is checked. When the device alternation designation is made, the channel operation transfers to the RESTART state. If it is not made, the channel shifts to IDLE state.

When the command bit (bit 8) is significant in INIT mode and when the INIT bit is set, it is checked and the command byte of CCB is outputted to the interrupt unit.

The device control bit (bit 9) is used when the operation mode of the device is not decisively determined, i.e. when there is a need for an operation mode other than the modes specified by the command field (bits 4 to 7) of CCW such as WRITE, READ, DMT, NOP and NULL modes. The device control bit is effective when the command field (bits 4 to 7) is INIT mode and the command bit (bit 8) is "0". When the bit is "1", it is not effective and the channel interprets the input/output data as the device control data and executes the device control. When the device control bit (bit 9) is "1", the channel executes the processing of the control data group specified by the transfer byte number and the start address.

Figure 10:
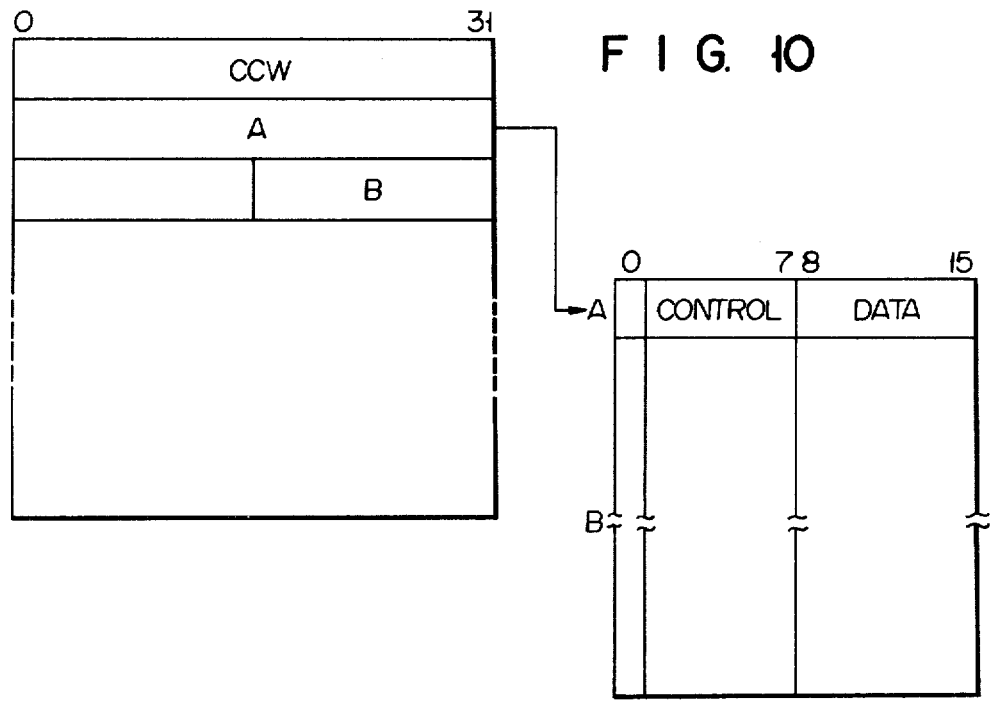
FIG. 10 shows a format of control data to control the input/output devices.

As seen from FIG. 10, the processing of the channel starts from the control data stored in the start address A of CCB. After a given transfer byte number B is transferred, the processing terminates. The control data is stored in the MMU as a control data block and the data format is comprised of a control field of 8 bits (control field command designation) and a data field of 8 bits. The channel controls the device in accordance with the control command designation (bits 1 to 7) and the designations are as shown in Table 2.

TABLE 2

| CODE | CONTENTS |
|---|---|
| 0 1 2 3 4 5 6 7 | |
| x 0 0 0 1 1 0 0 | To output the data field as a command |
| x 0 0 0 1 1 0 1 | To output the data field as data |
| x 0 0 0 0 1 0 0 | To input data and set it in the data field |
| x 0 0 0 0 1 0 1 | To input data and to AND it with data field. When the result of the AND operation is TRUE, the processing of the data control is ended. When the result is FALSE, the processing is continued. |
| x 0 0 0 0 1 1 0 | To input data and to AND it with data field. When the result of the AND is TRUE, the processing of the control data is continued, when it is FALSE, the processing is ended. |
| x 0 0 0 1 0 0 0 | To input status and set it in the data field. |
| x 0 0 0 1 0 1 0 | To input status and to AND it with the data field. When the result of the AND operation is TRUE, the processing of the control data is ended. When it is FALSE, the processing is continued. |
| x 0 0 0 1 0 1 1 | To input status and to AND it with the data field. When the result is TRUE, the data processing is continued. In the reverse case of the result, the data processing is ended. |

The channel controls the device in accordance with the contents of Table 2. At this time, the channel sets the input/output data (one byte) to and from the device in the data field.

The bit "0" in the control field of 8 bits is assigned to the continuation designation flag. The flag decides as to whether the channel advances to the processing of the control data after the data processing in the control field. When the flag is "1", the processing specified by the control data is interrupted and the processing is restarted by the next interrupt signal (ATN) on the channel dedicated bus. In other words, the channel processes the next control data after receiving the interrupt signal from the device. However, when the control data processing is started by the ATN signal on the channel dedicated bus, the first continuation bit is neglected. When the flag is "0", the channel continues the operation and advances to the processing of the control data.

Figure 11:
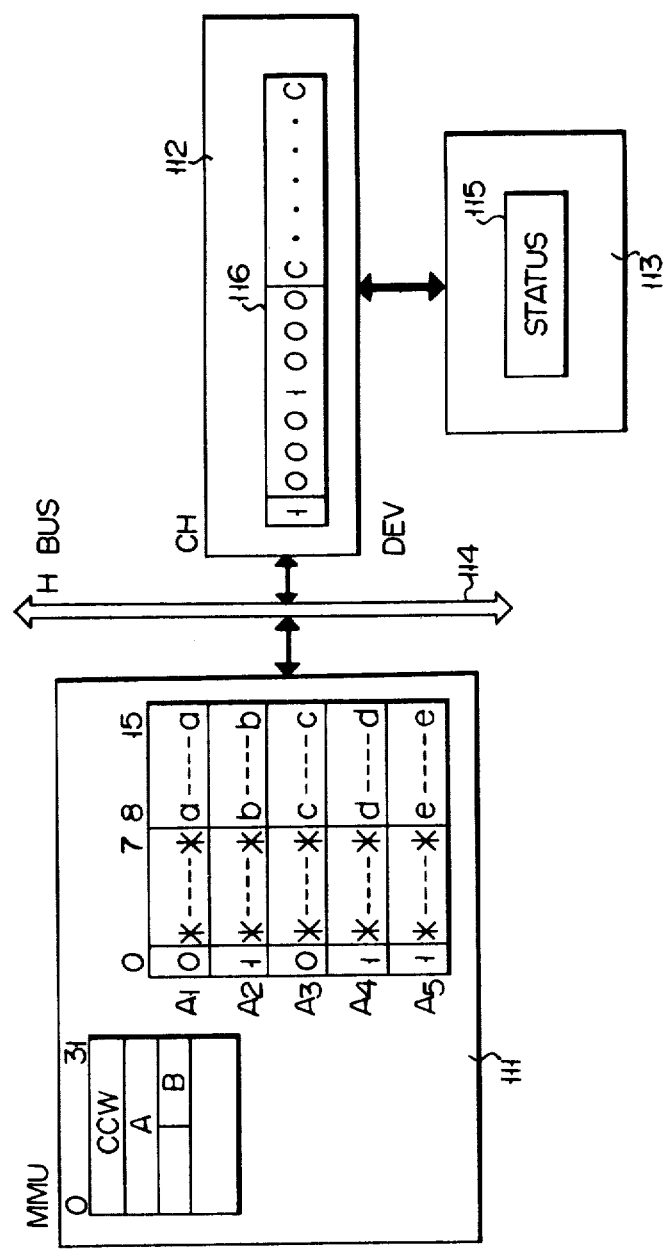
FIG. 11 diagramatically illustrates a control operation concept of the input/output devices in FIG. 10.

Referring now to FIG. 11, control data (a, . . . , a) to (e, . . . , e) are stored at addresses A1 to A5, respectively, in the MMU, the channel 112 processes the control data (a, . . . , a) and (b, . . . , b) and halts it. In response to the interrupt signal from the device side, the channel 112 processes the control data (c, . . . , c) and (d, . . . , d) and halts it again. Upon receipt of the interrupt signal from the device side, the control data (e, . . . , e) is processed and the processing of CCB is ended.

Explanation will be given of the control data of the address A3 in the control data block in MMU 111. The command designation of the control data A3 is the status request for the device. Receiving the status of the device 113, the channel 112 assigns the status to the data field and writes it into the address A3 of MMU 111. As a result, the data (c, . . . , c) at the address A3 of MMU 111 has read the status of the device. The neglect code bit (bit 10) is effective when the command is READ mode. When the bit is "1", if the data inputted of 8 bits is "00" (hexadecimal) or "FF" (hexadecimal), it is treated as neglect data and is transferred to MMU 111. When a paper tape reader, for example, is used for an input device, a reader field (located preceding the real data and comprised of continuous null codes or zero codes) is deleted. In other words, data "00" (hexadecimal) is not transferred to MMU 111 till the starting point of the real data. Since the input data of the reader field is unnecessary, it is, by convention, removed by the software technology. However, in the invention, the removal of the unnecessary input data is carried out by the channel, not by the software.

Referring now to FIG. 12, the input device first reads input data from a paper tape reader, for example. The check is made as to whether data other than "0" was included in the read data before them. If it has such data, the data is effective, and therefore it is loaded into MMU 111, and the channel waits for an interrupt for inputting the next data (one character). When there has been no such data, a check is made as to whether the data just read is "0" or not. If it is not "0", it is effective and therefore is loaded into MMU 111. If it is "0", it may be considered as data in the leader field and therefore the channel skips this data and goes to the next data input.

In addition to the paper tape reader, the input/output device may be a punch card, a magnetic tape, a magnetic card or the like.

The code conversion bit (bit 11) is effective when the command is READ mode or WRITE mode. When the bit is "1", the inputted data is data-converted in accordance with the code conversion table address.

The data code is not yet standardized and thus is frequently different between the arithmetic processing and the device. For example, between ASCII (American Standard Code for Information Interchange) and EBCDIC (Extended Binary Coded Decimal Interchange Code), the code conversion has been made by suitable programming. In the present invention, a hardware (a code conversion decoder) is used in the channel to lighten the burden of the software in the input/output processing.

The termination character bit 12 is used to stop the transfer when the same character as the termination character in CCB is detected in READ or WRITE mode. When the bit is "1", the data specified as the termination character is compared with the input/output data. When these are coincident to each other, the operation is ended regardless of the designation of the transfer byte number. In this case, the termination character per se is transferred. When the N bytes are transferred for one interrupt, only the last byte in N bytes is compared with the termination character.

After the processing of a CCB contents, when it is desired to continuously shift to the processing of another CCB, chaining is used. For example, when a series of data are inputted from a teletypewriter, and the data successively are outputted by the same type writer, the input processing is designated by CCB1 and the output processing by CCB2, the CCB1 is placed in the chain mode and the address of CCB2 is stored in the service pointer, in the form of the chain address. The use of CHAIN 1 (bit 13) or CHAIN 2 (bit 14) is properly selected depending on the length of the address. The CHAIN 1 bit (bit 13) is used in such a case where, at the completion of the data transfer, the chain address 1 is stored in the service pointer (set in bits 24 to 31 in CCW) and it is set as the storing head address of the CCB to be chained. After the operations of INIT, READ, WRITE modes, when the bits is "1", preparation is made of the processing of CCB specified by the address of CHAIN 1. The address of the chain 1 represents the distance from the present CCW to the next CCW and is expressed in blocks of four bytes. The chain address 1 is the storing head address of the CCB being currently processed and is deviated by from +127 bytes to −128 bytes from the CCW address. On the other hand, the chain address 2 is an absolute address and represents the CCB to be chained.

Also in the chain 2 bit (bit 14), if it is "1" after the completion of the operations of INIT, READ, and WRITE modes, preparation is made for the processing of the CCB in the address specified by the chain address. In the processing, the priority of CHAIN 1 is higher than that of CHAIN 2. Accordingly, when both the chains are designated simultaneously, CHAIN 1 is preferentially processed. The sum of the CCW address (CCB address) and the word number (each for four bytes) specified by the chain 1 address is chained as a new CCB address. The chain 1 address is expressed by 8 bits and expresses the word (4 bytes) unit. Accordingly, the chain 1 address can specify the address separated by 255 words (1020 bytes) at the maximum. The chain 2 address (24 bits) can directly specify the next CCB address. As described above, the concurrent executions of CHAIN 1 and CHAIN 2 are inhibited. Accordingly, when the chain designation bits (chain 1 bit and chain 2 bit) of CCW are both "1", CHAIN 1 is executed but CHAIN 2 is neglected.

The device alternation bit (bit 15) is used in a case where, after the input/output processing of the device A, for example, is completed, the input/output processing of another device B is succeedingly performed. This bit is effective when the chain is specified. When the bit is "1", the chain reads the input data from a paper tape reader specified by CCB1, for examples, and after the input is ended, the same data is outputted by a teletypewriter on the basis of the CCB2 designation. Here, CCB1 becomes a continuation designation to be described later which now designates chain. In other words, when the device alternation bit is "1", the device number in the new CCB after it is chained is used as a new device number. In an ordinary SIO instruction execution, the CPU delivers the device number. After the input/output processing is ended, the channel writes the channel number and the device number into the corresponding columns in CCB and completes the write operation. Therefore, when the SIO instruction makes the channel start, the device number previously loaded into CCB is insignificant. Incidentally, in the case of CHAIN, the device number in the new CCB is used as a new device number. Accordingly, before the new CCB is used, the device number must be stored.

A continuation bit (bit 16) is significant when CHAIN 1 or CHAIN 2 is designated. When this bit is "1", CCB is continuously processed.

A QUEUE bit (bit 17) designates the termination interrupt generation at the end of the CCB operation. When the termination interrupt is generated, the CCW address is stored in the QUEUE specified. This QUEUE is the QUEUE number stored in the SIO instruction or in the channel in accordance with CHAIN instruction and is not the QUEUE number in CCB. When the CHAIN designation exists and several kinds of processings are continued, it is important to know the final end processing by software.

For example, large QUEUE numbers (low level) are assigned to CCB1 to CCB3 and a small QUEUE number (high level) is given to CCB4. The acceptance level of the channel termination interrupt may be changed by switching PSW by program. When this level is high, the interrupt of CCB1 to CCB3 may be neglected while only the channel termination interrupt of CCB4 may be accepted.

In an ordinary SIO instruction execution, a QUEUE number is transferred from CPU to the channel and this is the level at the end of the processing. In this case, the QUEUE number in CCB has no meaning.

A status error flag in bit 19 is a flag which is set when an error takes place in the status of the device due to some cause.

A chain address 1 (from bit 24 to bit 31) shows a separation between the CCW address to be chained and the current CCW address when the chain 1 bit is designated.

As seen from the foregoing description, according to the invention, when the channel is started by the CPU, the channel directly reads out the CCB address and the CCB block from an address in the main memory without using CPU, and sets them in the service table in the channel. Accordingly, the CCB address and CCB block can be stored in any area in the main memory. Accordingly, the memory may be effectively used. Further, the channel directly makes an access to the main memory so that the time taken for overhead may be shortened. The channel command word includes a device alternation bit. For this, in case where, following the end of data transfer between an input/output device #A and a center machine, the channel continuously makes a data transfer with another input/output device #B, the channel automatically executes it, thus lightening the burden of software.

Two kinds of chain bits are included in the channel command word. With this construction, when the CCB block is stored in the main memory, it may discontinuously be stored in vacant areas of the memory, unlike the conventional one needing a continuous storing of it. If it is continuously stored, chaining is permitted so that the memory may be more effectively used compared to the conventional one.

The code conversion bit is included in the channel command word. This eliminates the code conversion by the software and therefore simplifies the program preparation to such an extent. Additionally, the memory area needed for the conversion program is not used thus to increase the vacant areas of the memory.

The use of the neglect code bit in the channel command word eliminates the control of software to inhibit the unnecessary data in the leader field inputted from the input/output device from being inputted to the I/O buffer. This results in simplification of program and increase of the effective capacity of the memory.

The use of the device control bit in the channel command word enables the hardware to variously control the operations other than READ, WRITE or DMT mode. Accordingly, the control by the software may be reduced to that extent and thus the programming is made easy.

What we claim is:

1. A method for controlling an input/output control system having a plurality of input/output units, a plurality of channels for controlling the plurality of input/output units, a central processing unit, and a main memory unit connected to said central processing unit and to said channels for storing channel control blocks having control information to allow said plurality of channels to control the transfer of data between said main memory unit and the plurality of input/output units, said control information including at least one starting memory address which identifies locations in said main memory unit where data transfer with said plurality of input/output units will begin and at least one count value, each corresponding to a different one of said at least one starting memory address, each said at least one count value indicating the size of said data transfer with said corresponding one of said plurality of input/output devices, said method comprising the steps of:

storing, by said central processing unit, said control information in said channel control blocks in said main memory;

executing, by the central processing unit, a single instruction containing a channel number identifying a designated channel, a unit number identifying an input/output unit to be activated, and channel control block address information to identify the location in said main memory for a selected channel control block, thereby delivering said channel control block address information to said designated channel;

accessing, by the designated channel, through a single operation of said designated channel, the location in said main memory corresponding to said channel control block address specified by said information contained in said single instruction and reading the selected channel control block specified by said channel control block address information into said channel; and controlling, by the designated channel, the data transfer for said input/output unit identified by said single instruction in accordance with the control information in said selected channel control block read into said designated channel including identifying, by the designated channel, each location in said main memory unit for the specified data transfer with said input/output unit using said at least one starting address and count value.

2. A method according to claim 1, also including the steps of:

identifying, by operation of said designated channel in response to control information in said selected channel control block, data inputted to said designated channel from said identified input/output unit which is from a leader field part of said data preceding a real data part of said data; and determining, by said designated channel, whether to preclude further operations on said leader field data based on said control information.

3. A method according to claim 1, also including the step of continuously carrying out input/output processing of other input/output units by operation of said designated channel in response to control information in said channel control blocks following the termination of input/output operation of said designated input/output unit.

4. A method according to claim 1, also including the steps of:

including in said control information code conversion information by which a mode specified in said control information is a READ or WRITE mode;

storing a code conversion table in a code conversion decoder in said designated channel; and accessing said code conversion table using data to be converted which is inputted to obtain code conversion, as an address.

5. A method according to claim 1 wherein said control information includes a channel control word containing command information and wherein the step of controlling the input/output operation includes the step of decoding, by said designated channel, said command information to determine the operation of said designated channel.

6. A method according to claim 1, wherein said main memory unit contains a control data block having command and data fields for use by said designated channel and wherein said control information includes information identifying the location in said main memory unit of said control data block, and wherein the step of controlling the input/output operation includes the steps of:

inputting, by said designated channel using said control data block location information, commands from said control data block, and interpreting, by said designated channel, said commands from said control data block to direct the operation of said designated channel.

7. A method according to claim 1, wherein said channel has a first operation mode in which said designated channel executes certain instruction, wherein said control information includes mode change information for adding other operation modes in which said designated channel executes additional instructions and wherein said method includes the step of decoding, by designated channels, said mode change information to determine the operation mode of said channel.

8. A method according to claim 7, in which said other modes comprise:

a mode for outputting a data field in the form of a command;

a mode for outputting the data field in the form of data;

a mode for inputting data and setting it in the data field;

a mode in which data is inputted and the inputted data is ANDed with the data field and, if the result of the AND operation is TRUE, the processing of the control data is ended, while, if it is FALSE, the processing of the control data is continued;

a mode in which data is inputted and the inputted data is ANDed with the data field and, if the result of the AND operation is TRUE, the processing of the control data is continued, while, if it is FALSE, the processing of the control data is ended;

a mode for inputting status into the data field;

a mode in which status is inputted and the inputted status is ANDed with the data field and, if the result of the AND operation is TRUE, the processing of the control data is ended, while, if it is FALSE, the processing of the control data is continued; and a mode in which status is inputted and the inputted status is ANDed with the data field and, if the result of the AND operation is TRUE, the processing of the control data is continued, while, if it is FALSE, the processing of the control data is ended.

9. A method according to claim 5 wherein said control information also includes a next channel control block address information and wherein the step of controlling the input/output operation includes the step of continuing the processing of said designated channel using control information in a channel control block specified by said next channel control block address information if said command information directs said designated channel to continue processing.

10. A method according to claim 6 wherein said control data block also includes a continuation field, and wherein said step of controlling the input/output operaton also includes the step of determining, by said designated channel from said continuation field, whether to continue interpreting commands from said command data block.

11. A method according to claim 3, wherein said control information includes first chaining information for continuously storing said control information in said main memory unit and second chaining information for discontinuously storing said control information in said main memory unit and wherein said method includes the step of interpreting, by said designated channel, said first and second chaining information to determine whether to continue processing with the selected channel control block.

* * * * *